(12) United States Patent
Battaglia et al.

(10) Patent No.: US 10,875,435 B1
(45) Date of Patent: Dec. 29, 2020

(54) HEADREST WITH PASSENGER FLAPS

(71) Applicant: Zoox, Inc., Menlo Park, CA (US)

(72) Inventors: Nahuel Elias Battaglia, Stanford, CA (US); Anke Christine Bodack, Encinitas, CA (US); Felix Jacob Lorsignol, San Francisco, CA (US); Andrew Frank Raczkowski, San Jose, CA (US); Herman Francisco Delos Santos, Redwood City, CA (US); Christopher John Stoffel, San Carlos, CA (US); Bryan Scot Thompson, Beverly Hills, CA (US); Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 15/717,680

(22) Filed: Sep. 27, 2017

Related U.S. Application Data

(63) Continuation-in-part of application No. 29/599,090, filed on Mar. 30, 2017.

(60) Provisional application No. 62/479,292, filed on Mar. 30, 2017.

(51) Int. Cl.
*B60N 2/853* (2018.01)
*B60N 2/00* (2006.01)
*B60N 2/874* (2018.01)

(52) U.S. Cl.
CPC .............. *B60N 2/853* (2018.02); *B60N 2/002* (2013.01); *B60N 2/874* (2018.02)

(58) Field of Classification Search
CPC .................. B60N 2/002; B60N 2/0276; B60N 2002/0268; B60N 2002/0272; B60Q 1/076; B60R 16/037
See application file for complete search history.

(56) References Cited

U.S. PATENT DOCUMENTS

| | | | | |
|---|---|---|---|---|
| 4,659,108 A | * | 4/1987 | Sack | B60R 22/44 180/268 |
| 4,693,516 A | * | 9/1987 | Knecht | B60N 2/809 297/391 |
| 4,813,634 A | * | 3/1989 | Zuck | B64D 25/08 244/122 A |
| 5,095,257 A | * | 3/1992 | Ikeda | B60N 2/002 318/568.1 |
| 5,552,986 A | * | 9/1996 | Omura | B60R 21/01 180/268 |

(Continued)

*Primary Examiner* — Babar Sarwar
(74) *Attorney, Agent, or Firm* — Lee & Hayes, P.C.

(57) ABSTRACT

A system and method for determining whether a passenger is seated in a seating area and, based at least in part on detecting the passenger, engaging or disengaging a flap in a headrest. Such a headrest may span multiple seats so that a single headrest is used by multiple passengers. Each of one or more flaps in the single headrest may then be configured by the passenger to provide each passenger with their own privacy and comfort. By actively controlling the state of the flap, a uniform passenger experience may be created so that the flap is in the same state upon a passenger entering the vehicle. Further, examples of the headrest are designed and configured to couple directly, or indirectly, to a vehicle body, such that the headrest does not couple directly to a seat or passenger seating area.

19 Claims, 14 Drawing Sheets

(56) References Cited

U.S. PATENT DOCUMENTS

| | | | | |
|---|---|---|---|---|
| 5,602,425 A * | 2/1997 | Wilhelmi | B60N 2/0276 | 180/271 |
| 5,694,320 A * | 12/1997 | Breed | B60N 2/002 | 701/45 |
| 5,829,838 A * | 11/1998 | Offenbacher | B60N 2/6009 | 297/408 |
| 5,865,463 A * | 2/1999 | Gagnon | B60N 2/002 | 280/730.2 |
| 5,927,803 A * | 7/1999 | Hehl | B60R 21/13 | 297/216.12 |
| 5,947,515 A * | 9/1999 | Fitch | B60N 2/24 | 280/748 |
| 5,983,148 A * | 11/1999 | Bigi | B60R 21/0156 | 180/268 |
| 6,084,314 A * | 7/2000 | McCurdy | B60N 2/002 | 307/10.1 |
| 6,088,640 A * | 7/2000 | Breed | B60N 2/002 | 701/45 |
| 6,169,947 B1 * | 1/2001 | Fukui | B60R 21/013 | 180/271 |
| 6,313,739 B1 * | 11/2001 | Roth | G01S 7/4972 | 180/273 |
| 6,393,133 B1 * | 5/2002 | Breed | G01F 23/20 | 382/100 |
| 6,421,591 B1 * | 7/2002 | Hackenberg | B60R 21/013 | 180/268 |
| 6,577,023 B1 * | 6/2003 | Stanley | B60N 2/002 | 307/10.1 |
| 6,629,575 B2 * | 10/2003 | Nikolov | B60N 2/4214 | 180/282 |
| 6,744,898 B1 * | 6/2004 | Hirano | H04R 5/023 | 381/333 |
| 6,805,404 B1 * | 10/2004 | Breed | B60N 2/002 | 297/216.12 |
| 7,040,697 B1 * | 5/2006 | Tuccinardi | B60N 2/879 | 297/217.3 |
| D524,211 S | 7/2006 | Tsuchiya | | |
| 7,278,682 B2 * | 10/2007 | Friedman | B60N 2/0276 | 297/216.1 |
| 7,580,782 B2 * | 8/2009 | Breed | B60R 21/013 | 280/728.1 |
| 7,720,585 B2 * | 5/2010 | Fukuda | B60R 21/013 | 180/268 |
| 7,958,582 B1 * | 6/2011 | Scamardo | A47C 7/383 | 5/632 |
| 8,169,311 B1 * | 5/2012 | Breed | G06F 3/0219 | 340/438 |
| D666,544 S | 9/2012 | Tsay et al. | | |
| 8,433,482 B2 | 4/2013 | Schaal et al. | | |
| 8,632,125 B2 | 1/2014 | Yamaguchi et al. | | |
| 8,925,862 B2 | 1/2015 | Ehlers et al. | | |
| D764,991 S | 8/2016 | Woodhouse et al. | | |
| D766,790 S | 9/2016 | Sethapun et al. | | |
| D770,349 S | 11/2016 | Ahn et al. | | |
| D788,000 S | 5/2017 | LeFranc et al. | | |
| D793,315 S | 8/2017 | Niemiec et al. | | |
| D796,403 S | 9/2017 | Ahn et al. | | |
| 9,796,303 B1 * | 10/2017 | Schonfeld | B60N 2/002 | |
| 9,845,027 B2 * | 12/2017 | Hashimoto | B60N 2/0276 | |
| 9,856,025 B2 * | 1/2018 | Jasny | B60N 2/995 | |
| 9,878,689 B1 * | 1/2018 | Jimenez | B60R 22/48 | |
| D812,538 S | 3/2018 | Lokers | | |
| D813,132 S | 3/2018 | Armigliato et al. | | |
| 10,377,285 B2 | 8/2019 | Soltner et al. | | |
| 10,427,562 B2 | 10/2019 | Gibbons et al. | | |
| 2001/0009327 A1 * | 7/2001 | Zeigler | B60R 21/207 | 280/735 |
| 2001/0035636 A1 * | 11/2001 | Adachi | G01S 17/026 | 280/735 |
| 2001/0040065 A1 * | 11/2001 | Takagi | B60R 21/01554 | 180/274 |
| 2002/0167486 A1 * | 11/2002 | Tan | B60N 2/002 | 345/156 |
| 2003/0015898 A1 * | 1/2003 | Breed | B60N 2/002 | 297/216.12 |
| 2003/0025793 A1 * | 2/2003 | McMahon | H04N 7/181 | 348/148 |
| 2003/0122669 A1 * | 7/2003 | Filippov | B60N 2/002 | 340/563 |
| 2003/0176959 A1 * | 9/2003 | Breed | B60N 2/0232 | 701/36 |
| 2004/0035631 A1 * | 2/2004 | Schlecht | B60R 5/047 | 180/271 |
| 2004/0056520 A1 * | 3/2004 | Cho | A47C 7/405 | 297/218.1 |
| 2004/0129478 A1 * | 7/2004 | Breed | B60N 2/002 | 180/273 |
| 2004/0160095 A1 * | 8/2004 | Swierczewski | B60N 2/4214 | 297/216.15 |
| 2004/0251366 A1 * | 12/2004 | Hishon | B60R 22/46 | 242/390.8 |
| 2005/0046584 A1 * | 3/2005 | Breed | B60C 11/24 | 340/13.31 |
| 2005/0071053 A1 * | 3/2005 | Yamada | B60N 2/0244 | 701/1 |
| 2005/0225135 A1 * | 10/2005 | Moses | B60N 2/60 | 297/228.1 |
| 2006/0031015 A1 * | 2/2006 | Paradie | G06K 9/00805 | 701/301 |
| 2006/0042851 A1 * | 3/2006 | Herrmann | B60N 2/002 | 180/271 |
| 2006/0195231 A1 * | 8/2006 | Diebold | B60R 21/013 | 701/1 |
| 2006/0208169 A1 * | 9/2006 | Breed | B60N 2/002 | 250/221 |
| 2006/0220426 A1 * | 10/2006 | Moffatt | B60N 2/42736 | 297/216.19 |
| 2007/0086624 A1 * | 4/2007 | Breed | G06K 9/00362 | 382/104 |
| 2007/0107969 A1 * | 5/2007 | Ootani | B60N 2/0232 | 180/282 |
| 2007/0176473 A1 * | 8/2007 | Sakai | B60N 2/002 | 297/216.12 |
| 2007/0228703 A1 * | 10/2007 | Breed | B60N 2/0232 | 280/735 |
| 2007/0267909 A1 * | 11/2007 | Truckenbrodt | B60N 2/002 | 297/410 |
| 2007/0294013 A1 * | 12/2007 | Rieth | B60N 2/2872 | 701/45 |
| 2008/0036186 A1 * | 2/2008 | Schockmel | B60N 2/888 | 280/735 |
| 2008/0147271 A1 * | 6/2008 | Breed | B60R 21/0132 | 701/36 |
| 2008/0147280 A1 * | 6/2008 | Breed | B60J 10/00 | 701/46 |
| 2008/0179924 A1 * | 7/2008 | Thompson | B60N 2/58 | 297/188.2 |
| 2008/0228359 A1 * | 9/2008 | Uchida | B60N 2/002 | 701/49 |
| 2010/0078974 A1 * | 4/2010 | Nathan | B60N 2/002 | 297/217.3 |
| 2010/0140987 A1 | 6/2010 | Alexander et al. | | |
| 2010/0213748 A1 * | 8/2010 | Pedrero Iniguez | B60N 2/865 | 297/410 |
| 2011/0043009 A1 * | 2/2011 | Inayoshi | B60N 2/002 | 297/216.13 |
| 2011/0098893 A1 * | 4/2011 | Hashimoto | B60N 2/0276 | 701/46 |
| 2011/0248534 A1 * | 10/2011 | Pinto Ribeiro | B60N 2/002 | 297/217.1 |
| 2012/0013155 A1 | 1/2012 | Hwang et al. | | |
| 2013/0026802 A1 * | 1/2013 | Freienstein | B60N 2/0276 | 297/216.1 |
| 2014/0246886 A1 | 9/2014 | Savard et al. | | |
| 2014/0355783 A1 * | 12/2014 | Subat | B60N 2/879 | 381/86 |

(56) References Cited

U.S. PATENT DOCUMENTS

| | | | |
|---|---|---|---|
| 2015/0115576 A1* | 4/2015 | Acker | B60R 21/23138 |
| | | | 280/728.2 |
| 2015/0123437 A1* | 5/2015 | Dillinger | B60N 2/002 |
| | | | 297/217.2 |
| 2015/0336482 A1* | 11/2015 | Pos | B60N 2/2821 |
| | | | 297/250.1 |
| 2016/0379631 A1* | 12/2016 | Wang | G06F 3/167 |
| | | | 704/275 |
| 2017/0291544 A1* | 10/2017 | Ishihara | B60K 35/00 |
| 2017/0320473 A1* | 11/2017 | Ohbayashi | G08G 1/166 |
| 2018/0079508 A1* | 3/2018 | Carlioz | B64D 11/0601 |
| 2018/0141465 A1* | 5/2018 | Kwon | B60N 2/0244 |
| 2018/0211541 A1* | 7/2018 | Rakah | G08G 1/096844 |
| 2018/0272977 A1* | 9/2018 | Szawarski | B60R 21/01512 |
| 2018/0281626 A1* | 10/2018 | Murakami | B60N 2/06 |
| 2019/0009695 A1* | 1/2019 | Schonfeld | B60N 2/0292 |
| 2019/0077419 A1* | 3/2019 | Samma | B60N 2/90 |

* cited by examiner

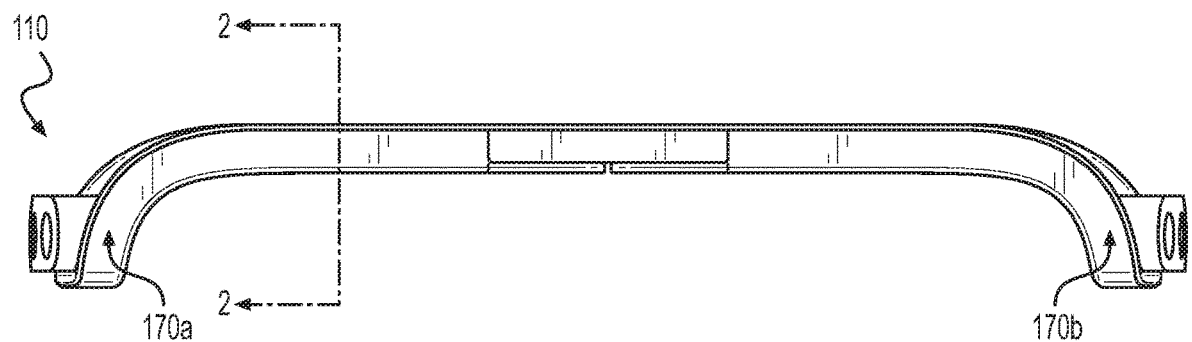
FIG. 1F
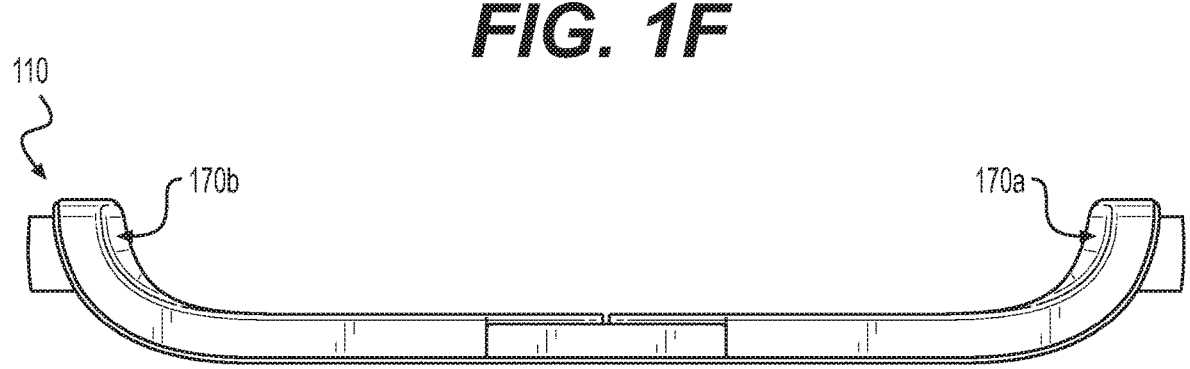
FIG. 1G
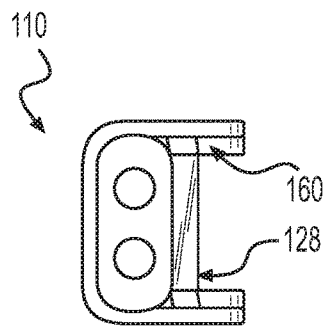 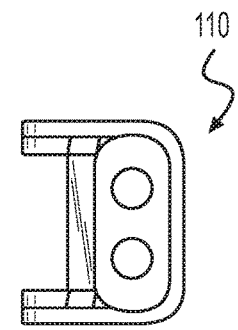
FIG. 1H                FIG. 1I

HEADREST WITH PASSENGER FLAPS

RELATED APPLICATIONS

This application claims priority to U.S. Provisional Application No. 62/479,292, filed Mar. 30, 2017, and U.S. Design patent application Ser. No. 29/599,090, filed Mar. 30, 2017, both of which are incorporated herein by reference.

BACKGROUND

Headrests are provided for passenger comfort and safety. Generally, these headrests are attached to individual seats, or banks of seats, in various forms of transportation, including aircraft, watercraft, automobiles and the like. These headrests are provided to both allow a passenger to rest their head, as well as absorb impact upon a crash event.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. Furthermore, the drawings may be considered as providing an approximate depiction of the relative sizes and shapes of the individual components within individual figures. However, the drawings are not to scale, and the relative sizes of the individual components, both within individual figures and between the different figures, may vary from what is depicted. In particular, some of the figures may depict components as a certain size or shape, while other figures may depict components on a larger scale or differently shaped for the sake of clarity.

FIG. 1F illustrates a top view of the example headrest of FIG. 1A.

FIG. 1G illustrates a bottom view of the example headrest of FIG. 1A.

FIG. 1H illustrates a right-side view of the example headrest of FIG. 1A.

FIG. 1I illustrates a left-side view of the example headrest of FIG. 1A.

DETAILED DESCRIPTION

Figure 1A:
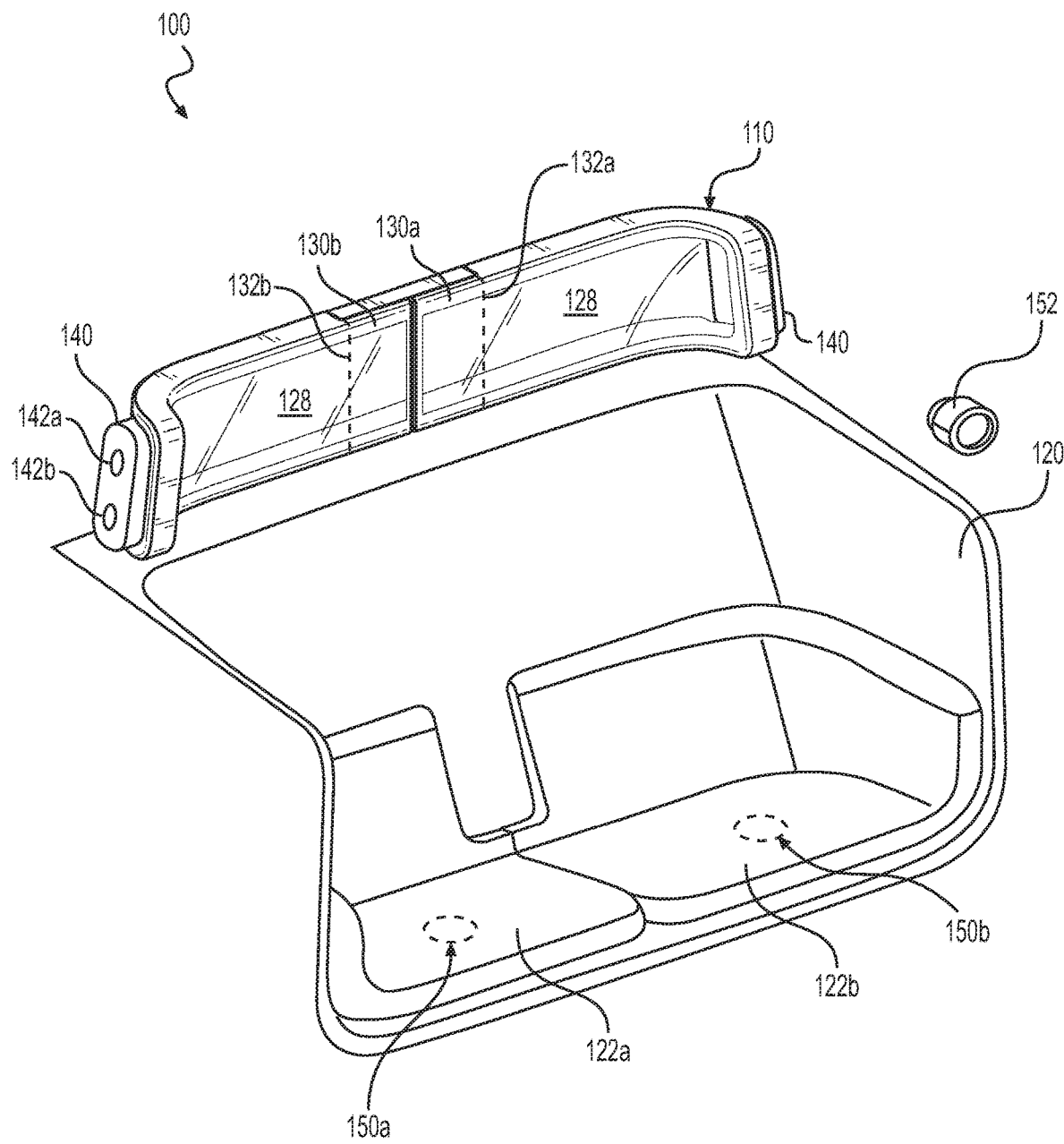
FIG. 1A illustrates a perspective view of an example headrest with passenger flaps relative to a seating area with the passenger flaps in a stowed position.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As briefly described above, headrests are used to provide passenger comfort and to provide a safety mechanism in the event of a vehicle crash by supporting and absorbing energy from an occupant's head and neck. Described in detail below is a headrest for a vehicle, such as a land vehicle (e.g., automobile, bus, truck, van, train, etc.), watercraft, aircraft, spacecraft, and the like. In some examples, unlike other headrests, the headrest described herein may be mounted independent of (i.e., not coupled to) a corresponding seating area, seat, or bank of seats. In some examples, the headrest may be a wraparound, conformal headrest, that wraps around at least a portion of an interior, passenger compartment, and/or seating area of a vehicle. In such examples, because the headrest is conformal and wraps around the interior of a vehicle, the headrest described herein may provide support and comfort for one or more passengers. For instance, in some examples a single headrest may wrap around substantially an entire interior of a vehicle body providing a headrest platform for any number of corresponding seats. In such examples, injuries to the head or neck of a passenger may be minimized, as such a configuration does not allow the head to roll off the headrest during a collision. In some examples, a separate headrest may be provided for each seat in the vehicle. In some examples, a headrest may be provided for a subset (e.g., at least two but less than all) of the seats in the vehicle. For instance, a headrest may be provided for each row or bench of two or more seats. In some examples, the headrest may wrap at least partially around at least three sides of an interior seating area of the vehicle. For instance, in some examples the wraparound headrest may span a back of the interior seating area and extend at least partially on to each lateral side of the interior seating area. Thus, in such examples, the wraparound headrest may have a substantially U-shape when viewed from above.

To provide personalized levels of comfort and privacy, the headrest may be provided with one or more flaps, depending on the number of corresponding passengers the vehicle is designed to accommodate. Any or all of the flaps may be positioned in a forward state, a back state, or any state in between the forward state and the back state. As used herein, the back state is referred to as the "stowed" state, while the forward state and states between the back state and the forward state are referred to as "deployed" states. In some examples the flap(s) may be infinitely adjustable (i.e., can be positioned to an infinite number of positions within a range of motion, such as between the forward state and the back state), or may have a finite number of discrete positions between the forward state and the back state. The flap(s) may be movable from one state to another manually or automatically. Manual actuation may be performed by a user simply grasping a flap and moving it to the desired position, or by the user pushing a physical or soft button, switch, lever, or other control to cause one or more actuators (e.g., electric motors, electromagnets, hydraulics, pneumatics, etc.) to move the desired flap(s). The flap(s) may hold any position at which they are stopped. In some examples, the flap(s) may be held in a set position by frictional forces, latching mechanisms, drive motors, brakes, or the like. When a flap is forward or otherwise deployed, the passenger associated with the flap will have an added level of privacy, as well as a surface upon which to rest their head.

Additionally, or in the alternative, in order to ensure that every customer has the same experience, in some examples the passenger flaps may be active. An active flap contemplates the use of hardware coupled with a computing device such that the computing device may cause the flap to move from a first state (e.g., forward position, back position, or somewhere in between) to a second state different than the first state. By incorporating one or more sensors in the seating area or the flap portion of the headrest, sensor data may be relayed to a computing device to ensure that the flap is in the same state whenever the passenger seating associated with the flap is unoccupied. This may be accomplished by connecting the flap to the headrest via springs, spring steel, or embedding the flap with an elastic material having a natural formation. An actuator, such as an electromagnet, may then be used to control the state of the flap (e.g. forward or back). In other examples, the actuator may comprise any type of hydraulic, pneumatic, electric, thermal, magnetic, or mechanical actuator.

In some examples described herein, the headrest may be coupled directly to the vehicle body. In other examples, the headrest may be coupled via a compliant coupling such that the compliant coupling can absorb energy from impacts, creating different dynamics and kinematics than if the headrest were directly coupled to the vehicle body. By using such a compliant coupling, passenger safety may be increased. In some examples, the headrest may be coupled to the vehicle body by an active coupling. In such examples, the active coupling may be mechanically driven to provide motion and/or damping of the headrest during an impact. In some examples, control of the active coupling may be based at least in part on a size, shape, weight, and/or other characteristics of a passenger using the headrest to further minimize effects imparted to the passenger due to an impact. Such examples will be discussed in detail with respect to the figures, as described below. In other examples, other forms of attaching the headrest are contemplated, such as other coupling mechanisms.

Example Headrest Design

Figure 1B:
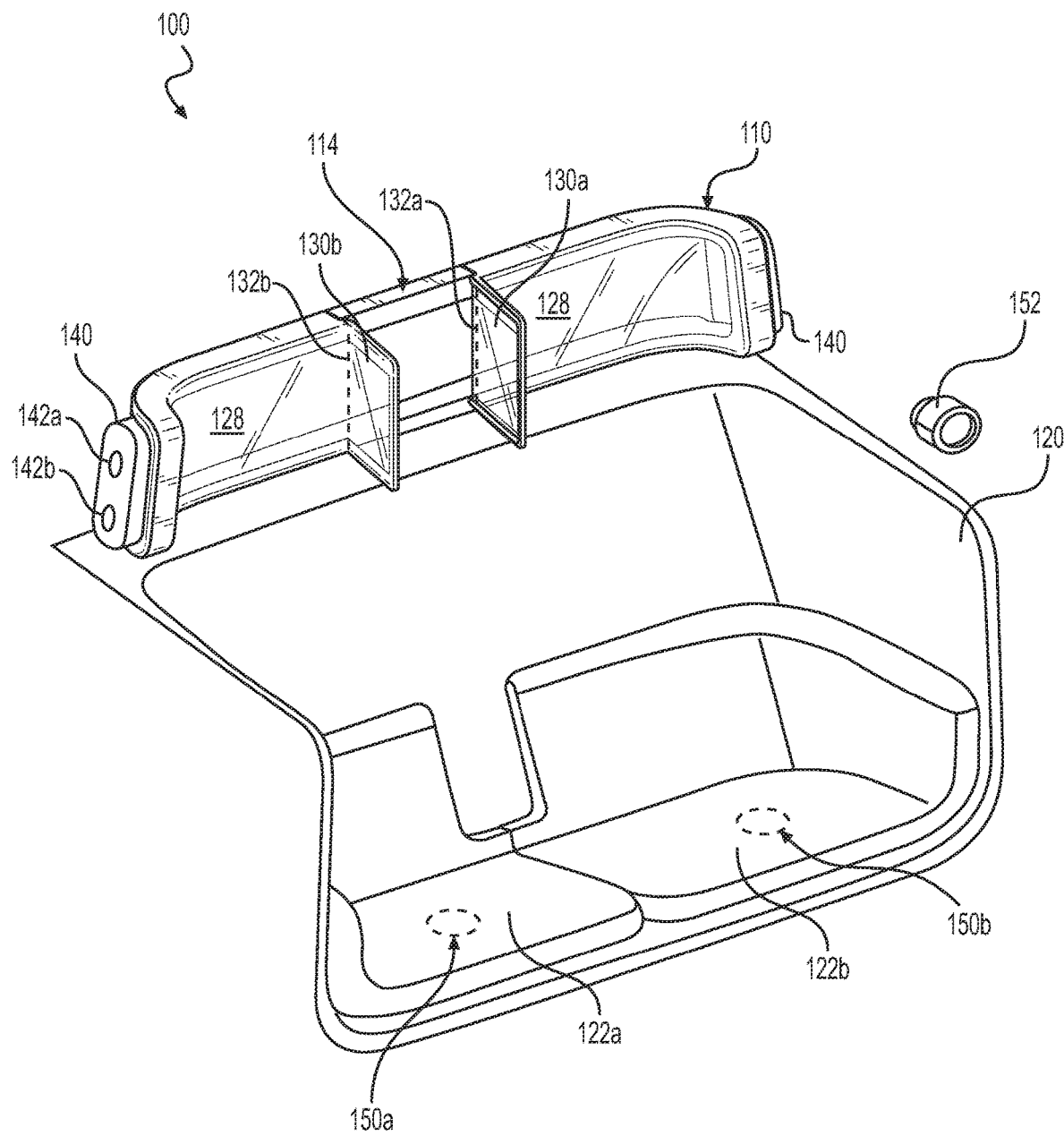
FIG. 1B illustrates a perspective view of the example headrest of FIG. 1A with the passenger flaps in a deployed position.

FIGS. 1A and 1B illustrate a passenger headrest system 100. Notably, such a system 100 includes a headrest 110 and a seating area 120. As illustrated, in some examples, the headrest 110 is not directly coupled to the seating area 120. Instead, in this example, the headrest 110 is configured to be coupled directly or indirectly to a body or frame of the vehicle. However, in other examples, the headrest 110 may be directly or indirectly coupled to the seating area 120.

In some examples, as further shown in FIG. 1A, the headrest 110 may comprise one or more flaps (two flaps 130a and 130b are shown in this example). FIG. 1A shows both of the flaps 130a and 130b in a fully stowed or "back" state, in which the flaps 130a and 130b are flush with a main surface 128 of the headrest 110. FIG. 1B shows both of the flaps 130a and 130b in a substantially fully deployed or "forward" state, in which the flaps 130a and 130b are substantially perpendicular to the main surface 128 of the headrest 110. While both flaps 130a and 130b are shown as being deployed in FIG. 1B, in some examples, each of the flaps can be operated independently of the other. Each flap 130a and 130b may pivot about a pivot line 132a and 132b. As will be discussed in further detail below, each of the flaps 130a,130b may be positioned in one or more positions (e.g., a forward state, back state, or other state). In some examples, the flaps may be actively positioned (e.g., by a computing device) with or without user input. In other examples, the flaps 130a, 130b may be passive or manual such that a passenger may move the flap 130a, 130b to any angle (e.g., by grasping the flap and moving it and/or by using a control to actuate the flap).

In some examples, such a headrest system 100 may be coupled to a vehicle body at one or more mounting areas 140. Such mounting areas 140 may comprise one or more receptacles 142a, 142b for receiving a fastening mechanism. As will be discussed in further detail below, in some examples, such fastening mechanisms may be any one or a combination of a nuts and bolts, welds, glue, epoxy, rivets, and the like. In some examples, the headrest system 100 may be attached to the vehicle body directly or via a coupling mechanism. In some examples (not shown), the headrest may additionally or alternatively be coupled to a seat in the seating area 120.

Also shown in FIGS. 1A and 1B are various sensor systems which may detect that one or more passengers are sitting in a particular seat of the seating area 120. As non-limiting examples, such sensor systems may include pressure sensors 150a, 150b located in each of the seats 122a, 122b of seating area 120, computer vision systems 152 for passenger detection and classification located within a vehicle cabin, motion detectors, and the like.

In some examples, the headrest 110 may be constructed with a flexible sheet or membrane of material wrapped around and stretched taught over a rigid frame 114. The flexible sheet or membrane of material may at least partially define or construct the main surface 128 of the headrest and/or the flaps 130a and 130b.

Figure 1C:
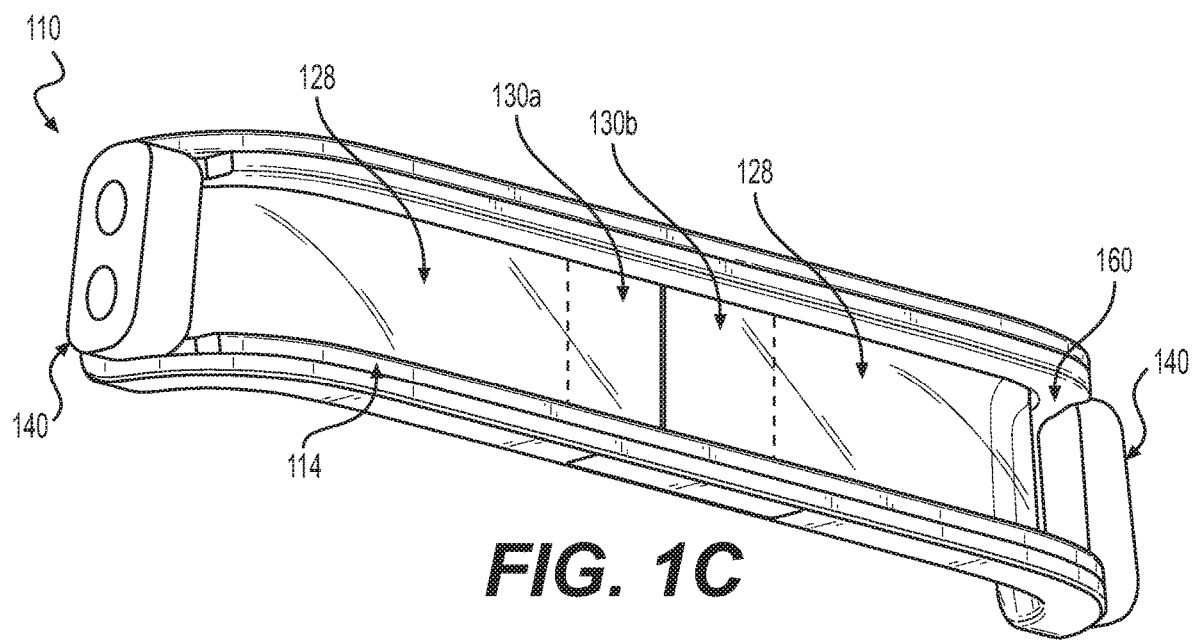
FIG. 1C illustrates a back perspective view of the example headrest of FIG. 1A.

FIGS. 1C-1I illustrate additional views of the headrest 110 showing additional details of the headrest 110 of FIG. 1A. For instance, FIG. 1C is a back perspective view of the headrest 110 showing the rigid frame 114 around which the flexible sheet or membrane is wrapped. The flexible sheet or membrane is illustrated by the oblique shade lines on the main body 128 and flaps 130a and 130b.

Figure 1D:
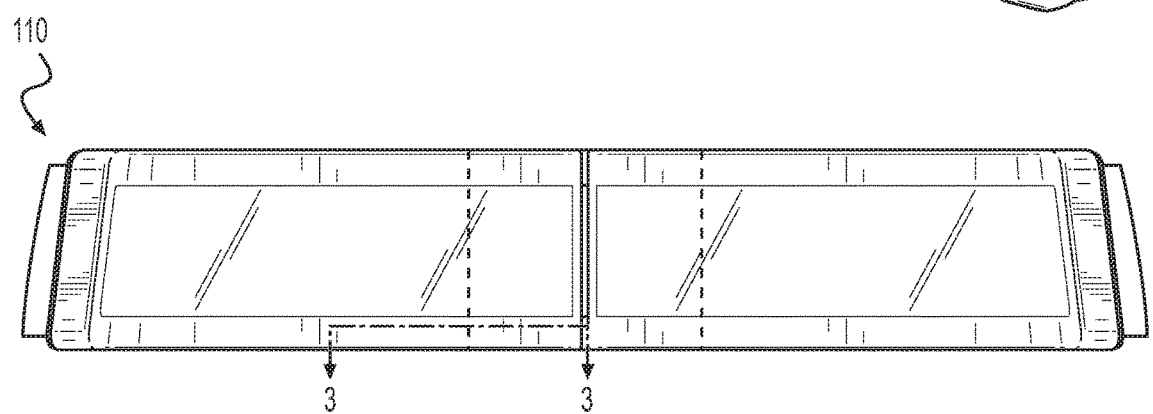
FIG. 1D illustrates a front view of the example headrest of FIG. 1A.
Figure 1E:
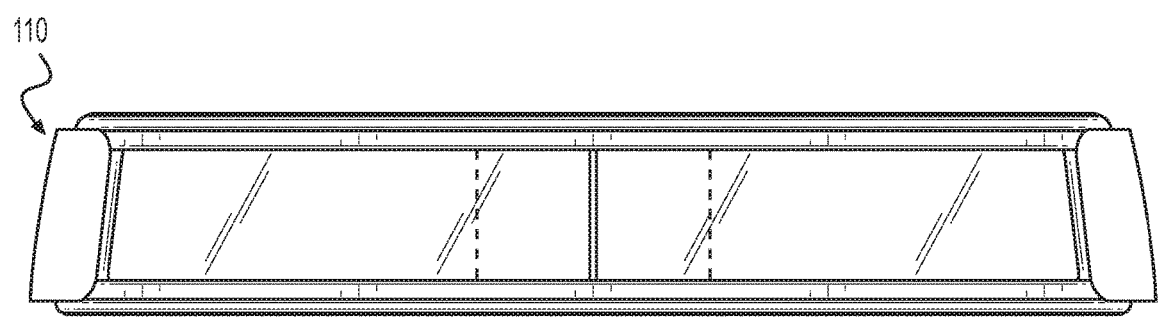
FIG. 1E illustrates a back view of the example headrest of FIG. 1A.

FIG. 1D is a front view, FIG. 1E is a back view, FIG. 1F. is a top view, FIG. 1G is a bottom view, FIG. 1H is a right-side view, and FIG. 1I is a left-side view of the headrest 110. FIGS. 1F and 1G illustrate the wrap around portions 170a and 170b of the headrest, which wrap at least partially round lateral side portions of the seating area of the passenger compartment of the vehicle.

Figure 2:
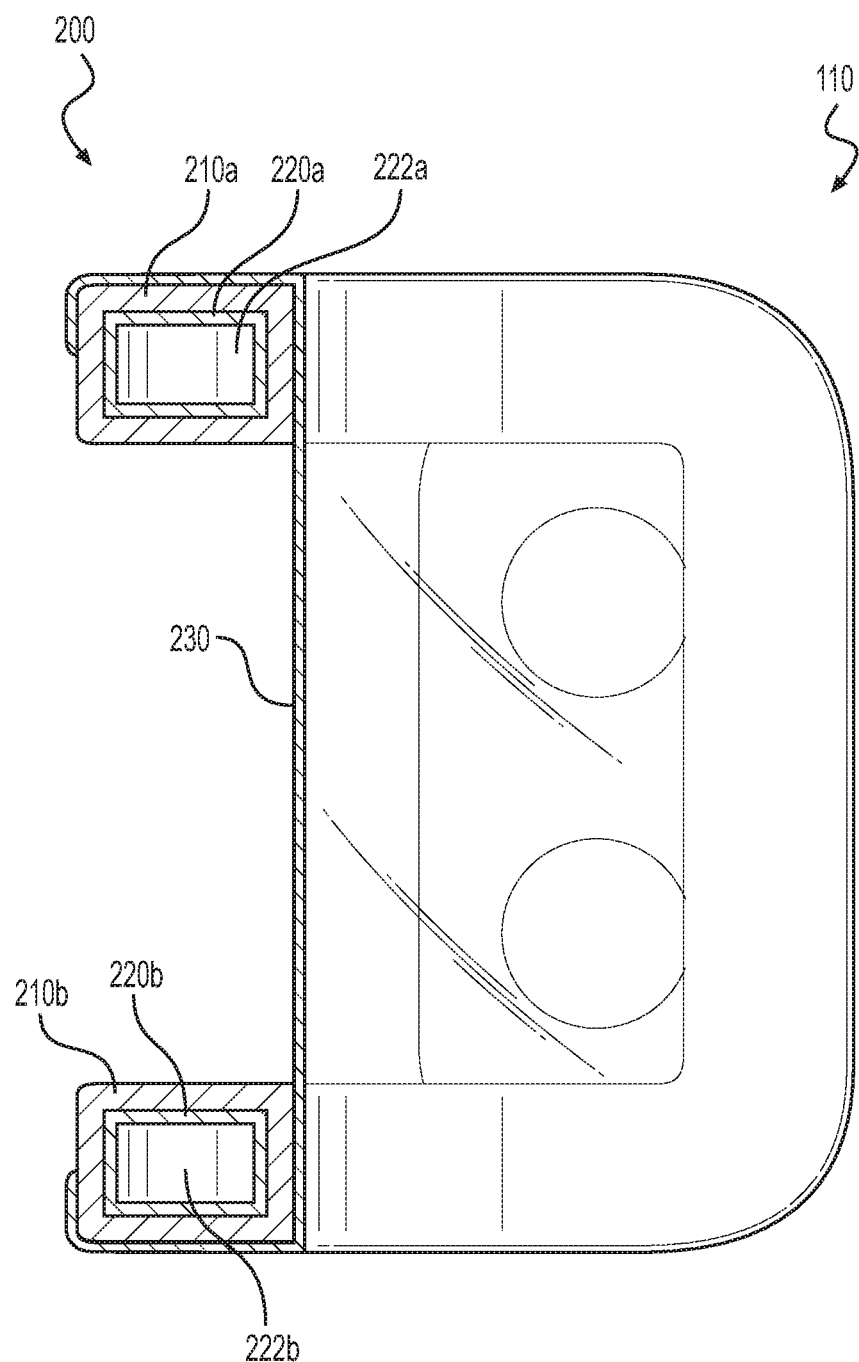
FIG. 2 illustrates cross-sectional view of the headrest as shown in FIG. 1.

FIG. 2 depicts an example cross-section 200 of the wraparound headrest 110 taken alone line 2-2 in FIG. 1F. As illustrated, in this example the headrest 110, may be designed in such a way as to provide safety for passengers, as well as to provide a certain level of elegance and an aesthetically pleasing design. In one example, such a headrest 110 may include a rigid frame 114, which may be formed from one or more rods or tubes 220a, 220b. In some examples, such rods or tubes 220a, 220b may be rectangular in cross-section, though any cross-sectional shape is contemplated. In some examples, such rods may be solid, while in the illustrated example the tubes 220a, 220b are shown as hollow, having a cavity 222a, 222b. The cross-sectional shape, materials, and thickness of such rods or tubes 220a, 220b may be determined to have strength and/or rigidity sufficient to provide passenger support for impacts at various speeds. In some examples, such as the illustrated example, the rods or tubes 220a, 220b are substantially rigid a frame of the headrest 110. By way of example and not limitation, the rods or tubes 220a, 220b may comprise metal, plastic, composite material (e.g., carbon fiber, fiberglass, etc.), or rigid or semi-rigid foam. In the illustrated example, each of the rods or tubes 220a, 220b are shaped in such a way as to conform to a vehicle body and wrap around all or at least a portion of the interior about a seating area, as shown in FIGS. 1A and 1B. In some examples, each of the rods or tubes 220a, 220b may comprise a single continuous piece wrapping around the interior of the seating area. However, in other examples, the rods or tubes 220a, 220b may comprise multiple pieces. In such an example, the individual pieces of the rods or tubes 220a, 220b may be individually coupled to the vehicle body, or they may be coupled to each other and attached to the vehicle body as a single unit.

In some examples, rods or tubes 220a and 220b may be covered by a resilient material 210a, 210b. Such a resilient material 210a, 210b is able to absorb energy from an impact and makes the headrest softer for passengers resting their heads against the outer frame portion of the headrest 110. In some examples, such a resilient material 210a, 210b may be foam, though any other energy absorbing material is contemplated. For example, in addition to or instead of foam, the energy absorbing materials may include, but are not limited to any one or combination of fabric, batting, beads, rubber, springs, or the like. In some examples, the resilient material 210a, 210b can be omitted.

A flexible sheet or membrane 230 may be wrapped around and tensioned over the frame formed by the rods or tubes 220a, 220b to form the main surface 128 and/or flaps 130a. In some examples, a flexible mesh material may be selected flexible sheet or membrane 230 to provide a transparent appearance to the headrest 110. In such examples, a passenger riding in a vehicle would be able to see through the mesh material of the flexible sheet or membrane 230. In other examples, other material may be used so that a passenger is unable to see through the headrest 110. Additionally, or in the alternative, the flexible sheet or membrane 230 of mesh material (or other material) may, in conjunction with resilient material 210a, 210b, provide energy absorption and safety to the passenger by elastic compression, tension, or expansion in the event of a vehicle crash or impact. Such energy absorption may be determined based on how taught the mesh material 230 is pulled to cover the headrest. In some examples, the tension in the flexible sheet or membrane 230 may be adjusted by adjusting a size, shape, and/or spacing of the rods or tubes 220a, 220b. In other examples, instead of the mesh material another flexible material such as fabric (e.g., woven fabric, non-woven fabric, etc.), finished plastic, unfinished plastic, leather, or the like. In some examples, the flexible sheet or membrane 230 may comprise a matrix of flexible plastic, a sheet of plastic or fabric with perforations, or the like. Such other material may comprise a sheet or other structure of material and may be transparent, semi-transparent, or opaque.

Figure 3A:
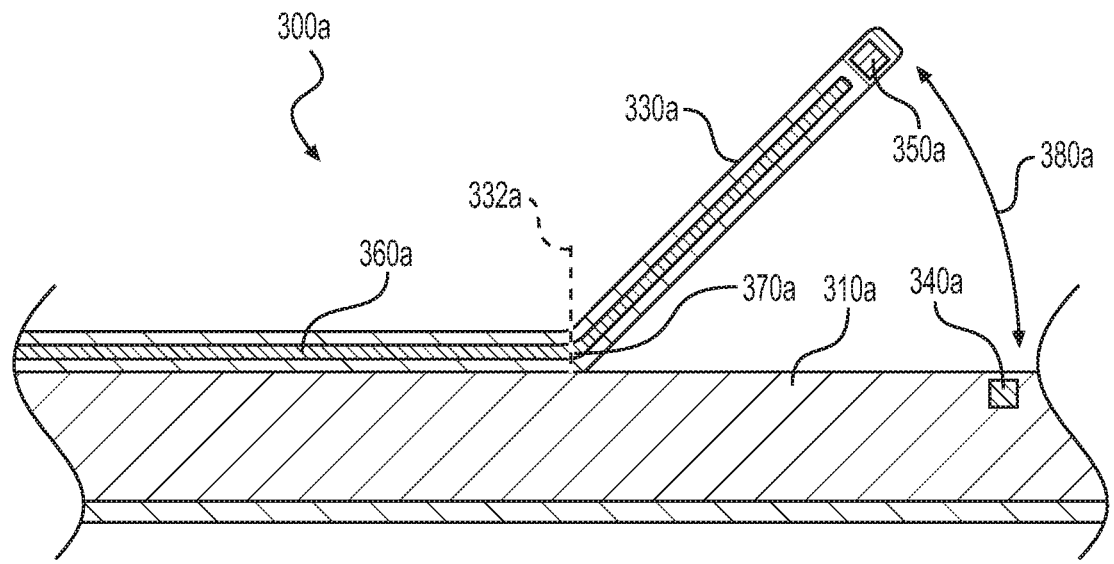
FIG. 3A depicts a cross-sectional view of an example active flap having a living hinge.

FIG. 3A shows a partial cross-sectional view of a flap portion of an example wraparound headrest 300a such the headrest 110 illustrated in FIG. 1A-1I. FIG. 3A corresponds to a view taken along line 3-3 in FIG. 1D. In this example, one or more flaps 330a (only one is shown, but the headrest may include any number of one or more flaps) along the wraparound headrest 300a may be pivotable about a pivot line 332a that extends vertically the height of the headrest 300a (similar to the pivot line 132 shown in FIGS. 1A and 1B). The flaps 330a may be used by one or more passengers to provide comfort and/or privacy. For example, a passenger may rest his or her head on such a headrest flap 330a. Additionally, or in the alternative, a passenger may use the flap 330a to create a screen between him or herself and a neighboring passenger. However, to create a consistent passenger experience from passenger to passenger, it may be desirable that such a flap 330a is in the same position whenever the seat is unoccupied. In some embodiments, the flap 330a may always revert to a forward or "deployed" state (e.g., extended to a partially deployed state as shown in FIG. 3A) when there is no passenger present in the seating area associated with the flap 300a. In other embodiments, the flap 330a may always revert to a back or "stowed" state (i.e., aligned with a headrest frame or body 310a) when there is no passenger present in the seating area associated with the flap 330a. In further embodiments, the flap 330a may default to any position in a given range of motion between a forward state (fully deployed) and the back state (stowed).

In one example, a "natural" state of the flap 330a may be provided through the use of an elastic member 360a. In this example, the flap(s) 330a may be pivotable about a living hinge 370a (i.e., a portion of the elastic member 360a that is more flexible than other portions and at which the elastic member bends to allow movement of the flap(s) 330a). A first end of the elastic member 360a may be embedded in or comprise part of the flap 330a and a second end of the elastic member 360a may be embedded in or comprise part of the headrest frame or body 310a. Such an elastic member 360a may be formed such that the natural state of the flap 330a is in the forward state. However, in other examples, the elastic member 360a may be formed such that the natural state of the flap 330a is in a partially deployed state, positioned between the forward state and a back state, as shown in FIG. 3A. Additionally, or in the alternative, if a material (e.g., fabric, mesh, or other flexible sheet or membrane of material) surrounds elastic member 360a, the bulk elastic properties of the surrounding material (i.e., material of the flap region 330a which surrounds elastic member 360a) may be taken into account when determining the material properties of the elastic member 360a. As non-limiting examples, elastic member 360a may comprise spring steel, plastic, rubber, elastomers, or other material having sufficient elastic modulus to return the flap 330a to its natural state. As such, the elastic member 360a will supply a spring force as a passenger attempts to deform it to a back state. While this example illustrates the elastic member 360a bending at a pivot line 332a, in some examples, the living hinge 370a may comprise a length (e.g., 1 inch, 3 inches, 6 inches, 12 inches, up to an entire length) of the elastic member 360a such that the bending or curvature of the flap 330a is accomplished over the length of the elastic member defined by the living hinge 370a. In that case, bending of the elastic member 360a is not limited to a single pivot line 332a and may instead be spread over the length of the living hinge 370a, which enables a larger bend radius for the flap and/or multiple different radiuses of curvature over the length of the living hinge 370a.

In other examples, the flap 330a may not comprise elastic member 360a. Instead, the flap 330a may have a single pivot point (or line) 332a, which may be implemented using a spring (e.g., torsion spring, coil spring, etc.) having two arms (e.g., rigid or semi-rigid arms). One arm may be attached to the headrest frame or body 310a and the other arm may be connected to a flap 330a such that a natural angle is maintained between the flap 330a and the headrest body 310a (e.g., the flap 330a is in the forward position or the partially deployed state shown in FIG. 3A) when no force is applied to the flap 330a. In such an example, the flap 330a may be separate from the headrest body 310a and coupled via the spring.

In some examples, one or more of the headrest body 310a and the flap 330a may comprise one or more sense and actuate components 340a, 350a. Each of elements 340a and 350a may comprise sense components, actuate components, or both sense and actuate components. By way of example and not limitation, sense components may comprise any Hall effect sensors, inertial sensors, piezoelectric sensors, strain gauges, position sensors, linear or rotary encoders, photo diodes, cameras, or any other suitable electromagnetic, mechanical, and/or optical sensor(s). Also by way of example and not limitation, actuate components may comprise any electrical, magnetic, thermal, hydraulic, pneumatic or other device that can cause motion of a flap or portion thereof. In some examples, each of the sense and actuate components 340a, 350a may be embedded in the flap 330a and/or headrest body 310a such that that they are imperceptible to a passenger. In other examples, the sense and actuate components 340a, 350a may be disposed in, on, and/or coupled to the flap 330a and/or headrest body 310a. Such sense and actuate components 340a, 350a may create a force, such as an electromotive force, over region 380a. In some examples, the force may be strong enough to overcome the spring force maintaining the flap 330a in the natural state. As a non-limiting example, such an actuator 350a may comprise a magnet (and/or ferrous metal) embedded in the flap 330a with corresponding actuator 340a comprising an electromagnet embedded in the headrest body 310a, or vice versa. In such an example, when the electromagnet is engaged, the electromagnetic force overcomes the spring force holding the flap 330a in the natural state, bringing the flap 330a to the back state. In another non-limiting example, an actuator 340a and/or 350a may comprise a motor disposed to engage the elastic member 360a via one or more gears, linkages, screws, cables, pulleys, or the like. The motor may engage the elastic member 360a for one way motion. In that case, activation of the motor causes the elastic member 360a to be deformed into a desired state, while deactivation allows the elastic member 360a to return to its natural state. Alternatively, the motor may be coupled to the elastic member 360a (or a non-elastic member) for two-way movement. In that case, the elastic member 360a (or a non-elastic member) may be driven to a desired state and maintained (e.g., locked by mechanical or electrical means) in that state until driven by the motor to another position within the range of motion. That is, actuation of the motor results in movement of the flap 330a. Further, as discussed above, the actuators may comprise any type of hydraulic, pneumatic, electric, thermal, magnetic, and/or mechanical actuator.

In some examples, a sensor or camera may be used to determine flap data indicating that a passenger has moved the flap 330a to a forward state, a back state, or an intermediate state between the forward and back states. In that case, the camera may be an example of a sense components 340a and/or 350a, or the camera may be a separate component mounted in the passenger compartment of the vehicle. As non-limiting examples, a single sensor in sense and actuate component 340a may be used to detect a magnetic field when the sense and actuate component 350a is a magnet, though any other of a proximity sensor, line of sight sensor, electrical connection sensor, pressure sensor, encoder, range sensor, or other sense component may additionally or alternatively be used to determine that the flap 330a is in a forward, back, or intermediate state. The sensor may simply determine whether the flap 330a is in a particular state or not, or may determine a particular state or position in which the flap 330a is currently located. In the latter case, the particular state or position may be expressed in terms of an angle (e.g., angle relative to a stowed or neutral position), a percentage of deployment (e.g., 30% deployed), or any other identification of the particular state or position. In such an example, a computing device (not shown in this figure) may determine not to reset the flap 330a if it is also determined that a passenger is present.

As will be discussed in further detail below, such a computing device may also receive a signal that a passenger is no longer in the seat associated with flap 330a. In such a scenario, the computing device may cause the flap 330a to move to a normative state. In some examples, such a normative state may be the forward state. In other examples, such a normative state may be the back state, natural state, or any other state in a range of motion of the flap 330a.

Figure 3B:
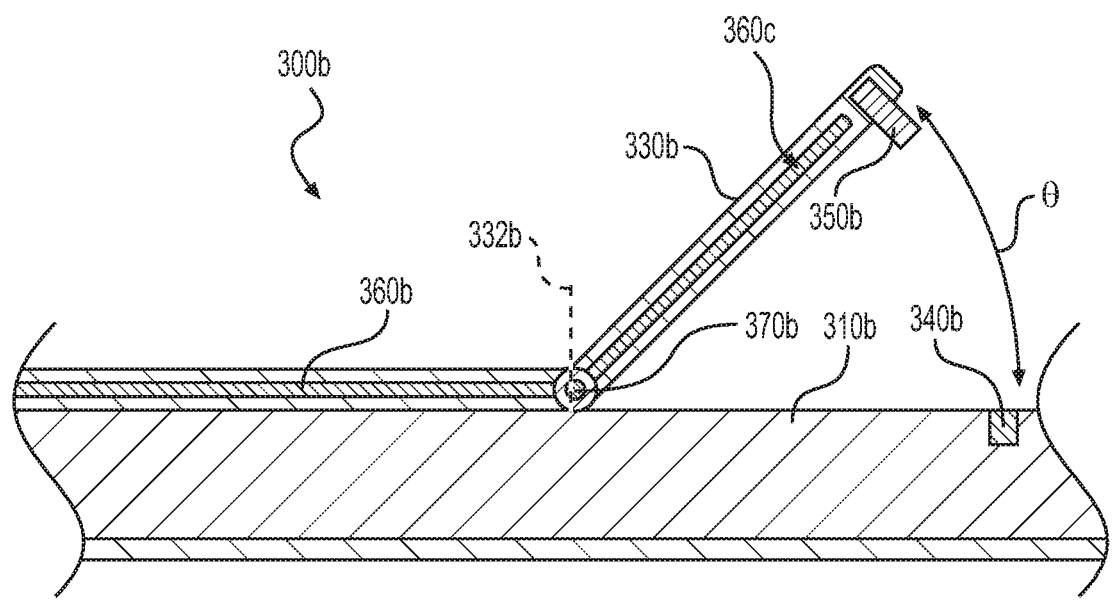
FIG. 3B depicts a cross-sectional view of an example active flap having a spring hinge.

FIG. 3B is a partial cross-sectional view of a flap portion of another example wraparound headrest 300b such the headrest 110 illustrated in FIG. 1A-1I. Like FIG. 3A, FIG. 3B corresponds to a view taken along line 3-3 in FIG. 1D, and shows an example that may be used instead of the example shown in FIG. 3A, or aspects of the examples shown in FIGS. 3A and 3B may be combined to implement a headrest according to this disclosure. In this example, one or more flaps 330b (only one is shown, but the headrest may include any number of one or more flaps) along the wraparound headrest 300b may be pivotable about a pivot line 332b that extends vertically the height of the headrest 300b (similar to the pivot line 132 shown in FIGS. 1A and 1B). The example of FIG. 3B is similar to that of FIG. 3A except that instead of a living hinge like that of FIG. 3A, FIG. 3B illustrates a mechanical hinge (e.g., continuous hinge, butt hinge, concealed hinge, spring hinge, or the like). In this example, the headrest 300b includes a stationary member 360b coupled to a movable member 360c. The stationary member 360b and/or the movable member 360c may be rigid, semi-rigid, or flexible members. In the illustrated example, each of the stationary member 360b and the movable member 360c represents a rigid frame over, on, or between which a flexible sheet or membrane of material is stretched. The movable member 360c is pivotable relative to the stationary member 360b about the hinge 370b.

In this example, the hinge 370b comprises a spring hinge that is spring loaded to bias the movable member 360c toward a fully deployed position (shown in FIG. 3B). The fully deployed position in this example may be an angle θ between about 15 degrees and about 90 degrees relative to the headrest body 310b. In some examples, the angle θ may be about 30 degrees, 45 degrees, 60 degrees, 75 degrees, or any other angle between about 15 degrees and about 90 degrees. The headrest 300b also includes a latch mechanism comprising a first portion 340b and a complimentary or mating second portion 350b. The first portion 340b of the latch mechanism may comprise a receptacle, clamp, clip, protrusion, magnet, or other feature to receive, engage, and/or hold the second portion 350b of the latch mechanism. By way of example and not limitation, the latch mechanism may be a "push-push" or "push-to-latch/push-to-unlatch" mechanism, in which the flap 330b may be latched into the stowed position flush with the headrest body 310b by pushing the second portion 340b of the latch mechanism on the flap 330b into engagement with the first portion 340b of the latch mechanism on the headrest body 310b. Thereafter, the latch mechanism may be disengaged and the flap 330b may be deployed by pressing on the outer edge of the flap 330b proximate to the second portion 350b of the latch mechanism, thereby allowing the spring hinge 370b to pivot the flap 330b to the deployed position shown in FIG. 3B.

Additionally, or in the alternative, flap 330b may have a passive internal mechanism such that a passenger may move the flap to any position and, further, that such a flap 330b is held or maintained by the passive internal mechanism so that it remains in that position until moved by the same or another passenger. In some examples, the passive internal mechanism may apply a frictional force to maintain the flap 330b in position. In some examples, the frictional force may be imparted by an interference fit between a hinge pin and one or more barrels or knuckles of the hinge. The amount of friction applied by the passive internal mechanism may be determined by material and/or surface finish of the hinge (or one or more components thereof). In some examples, the passive internal mechanism may comprise a detent mechanism that applies a holding force to hold the flap in one of multiple discrete positions. In that case, the flap can be moved by applying a force sufficient to overcome the holding force and move the flap to a next discrete position. In some examples, the passive internal mechanism can comprise a ratcheting mechanism similar to that used on a chase lounge, in which the flap can be moved toward a deployed position, but will be locked against movement toward the stowed position until the flap is moved to the fully deployed position (e.g., forward position), at which point the flap can be returned all the way to the fully stowed position.

Additionally or alternatively, the flap 330b may be driven by an electrical, mechanical, thermal, hydraulic, and/or pneumatic actuator (not shown in this figure). For instance, a central shaft of the hinge 370b may comprise an axle that is fixed against rotation relative to the flap 330b and can be driven by a motor (e.g., electric, hydraulic, pneumatic, etc.) directly or via one or more gears, linkages, screws, cables, pulleys, or the like to pivot the flap 330b.

Figure 4:
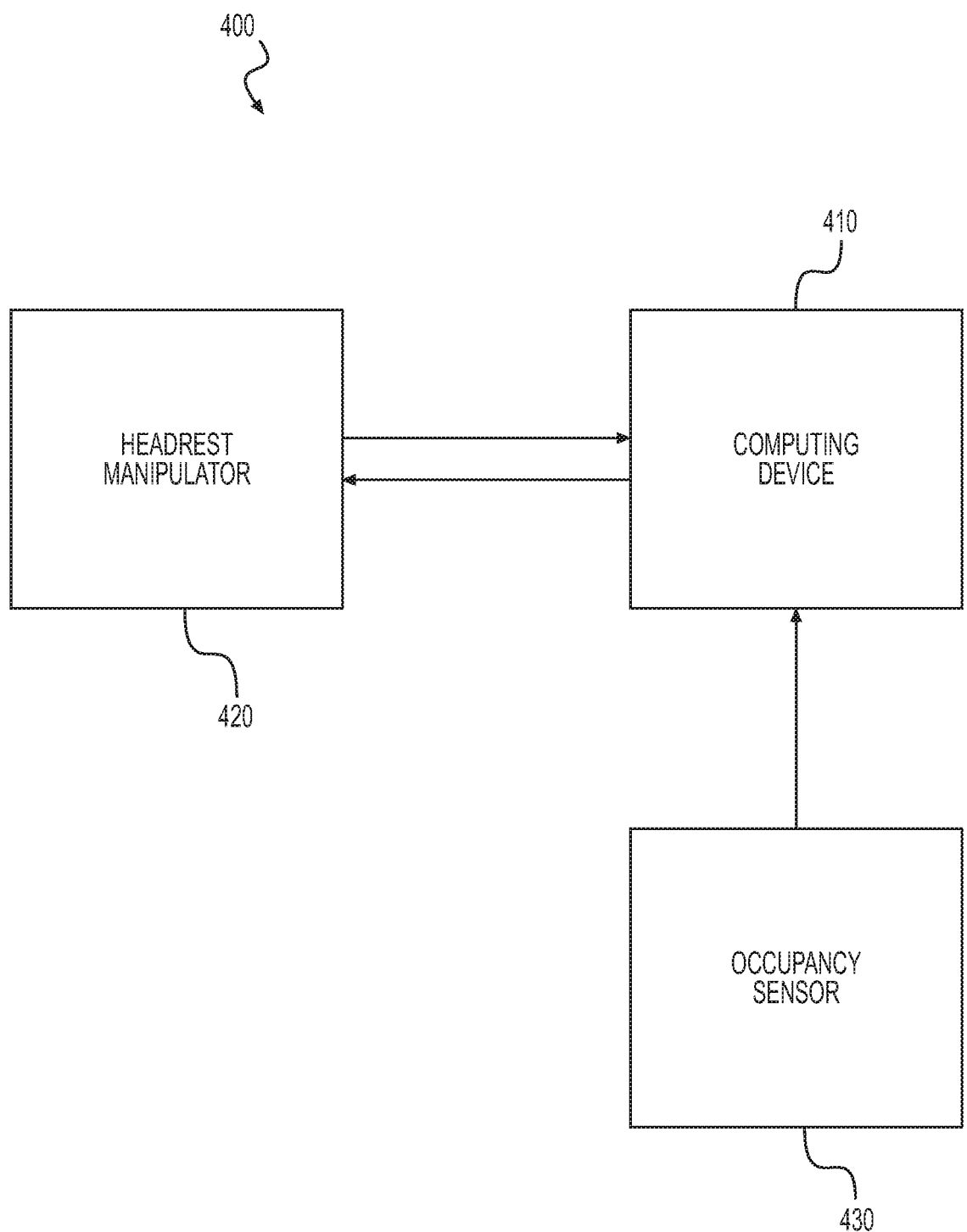
FIG. 4 illustrates an example block diagram for controlling the active flaps.

FIG. 4 illustrates a block diagram of a system 400 for controlling operation of a flap such as those shown in FIGS. 1A-1I, FIG. 2, and FIGS. 3A and 3B. As shown, such a system 400 may have an occupancy sensor 430. As non-limiting examples, such an occupancy sensor 430 may comprise a pressure sensor located under a seating area associated with each flap (e.g., sensors 150a and 150b in FIG. 1), a computer vision system located within the cabin of the vehicle with object detection and classification capabilities such that the computer vision system may determine whether a passenger is sitting in a seat associated with each flap (e.g., camera 152 may be part of such a vision system), a sensor located in a seatbelt mechanism associated with each seat, a motion sensor, or the like. The occupancy sensory 430 may be comprised of any one or more of these and/or other sensors.

Sensor signals from occupancy sensor 430 may then be relayed to a computing device 410 as occupancy data. Additionally, or in the alternative, sensor signals located in a headrest manipulator 420 may be provided to a computing device 410. Such a computing device 410 may then determine to activate a headrest manipulator 420. The headrest manipulator 420 may comprise any or all of the motors or other actuators described herein for actuation of the flaps and/or active coupling of the headrest. As illustrated in the matrix below, the computing device may determine to engage (i.e., activate) or disengage (i.e., provide no signal to actuator) the flap, such that the flap is controlled by the passenger when occupied and returns to a normative state when there is no passenger present.

| Normative Flap State | Passenger Detected | Current Flap State | Compute Signal |
|---|---|---|---|
| Forward | Yes | Forward | Disengage |
| Forward | Yes | Back | Engage |
| Forward | No | Forward | Disengage |
| Forward | No | Back | Disengage |
| Back | Yes | Forward | Disengage |
| Back | Yes | Back | Engage |
| Back | No | Forward | Engage |
| Back | No | Back | Engage |

Figure 5A:
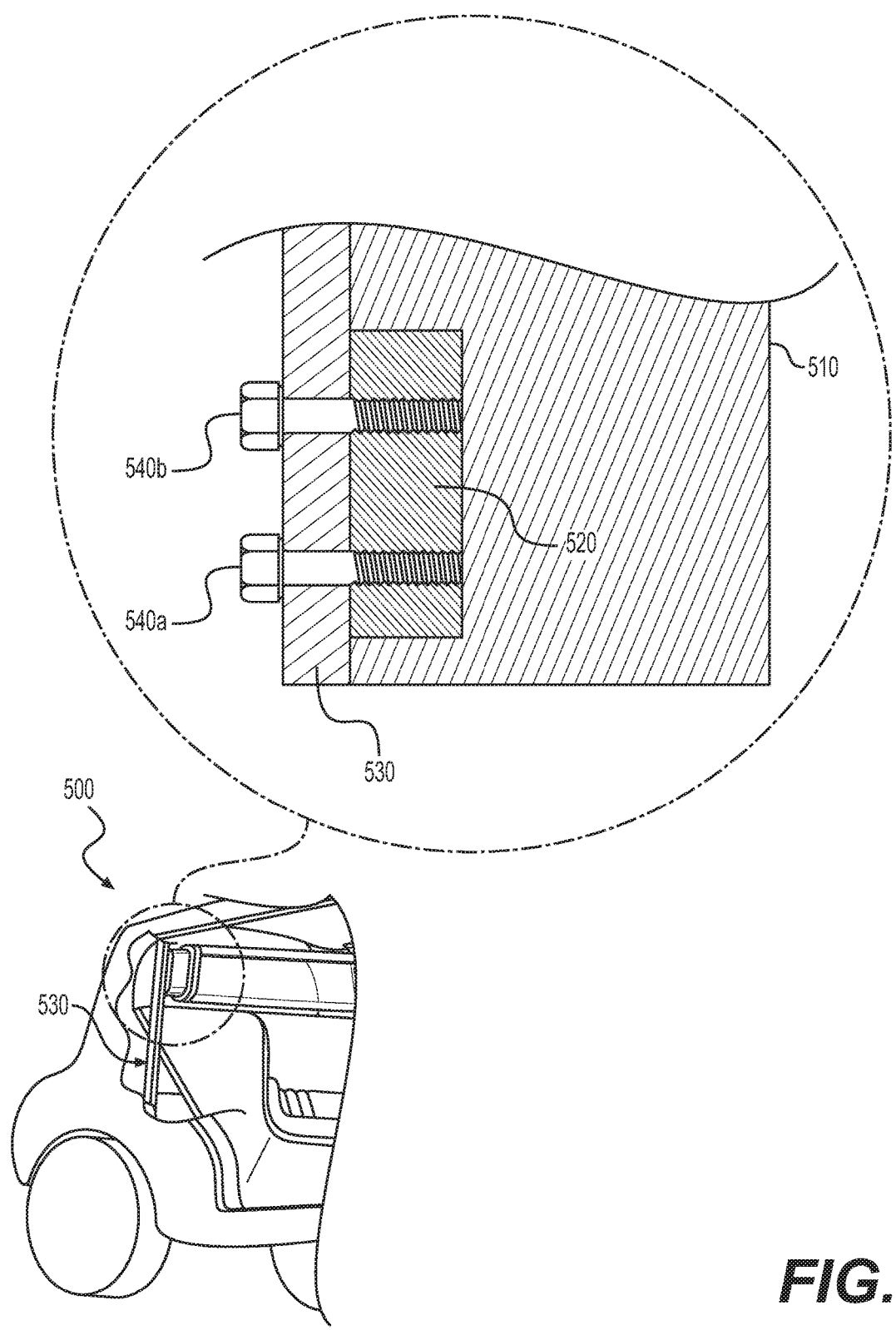
FIG. 5A depicts an example in which a headrest may attach to a vehicle frame.

FIGS. 5A-5D illustrate four different example ways in which a headrest, such as headrest 110, can be attached to a vehicle. FIG. 5A illustrates an example in which a headrest 510 may be directly coupled to a body or frame of a vehicle 500. In such an example, the headrest 510 may be affixed directly to the vehicle body 530. As illustrated in FIG. 5A for merely exemplary purposes, in one example, the headrest 510 may be affixed to the vehicle body 530 by one or more bolts 540a, 540b. Such bolts 540a, 540b may be received by an insert or receptacle 520 formed integrally with headrest 510 and configured to receive bolts 540a, 540b. In other examples, the headrest 510 may be affixed to the vehicle body 530 by any other fastening mechanisms, such as glue, epoxy, welds, screws, rivets, clips, magnets, snaps, and the like. In some examples, the fastening mechanism may be integrated into the headrest 510 or the vehicle body 530. In other examples, the fastening mechanism may be integrated into both the headrest and the vehicle body.

Figure 5B:
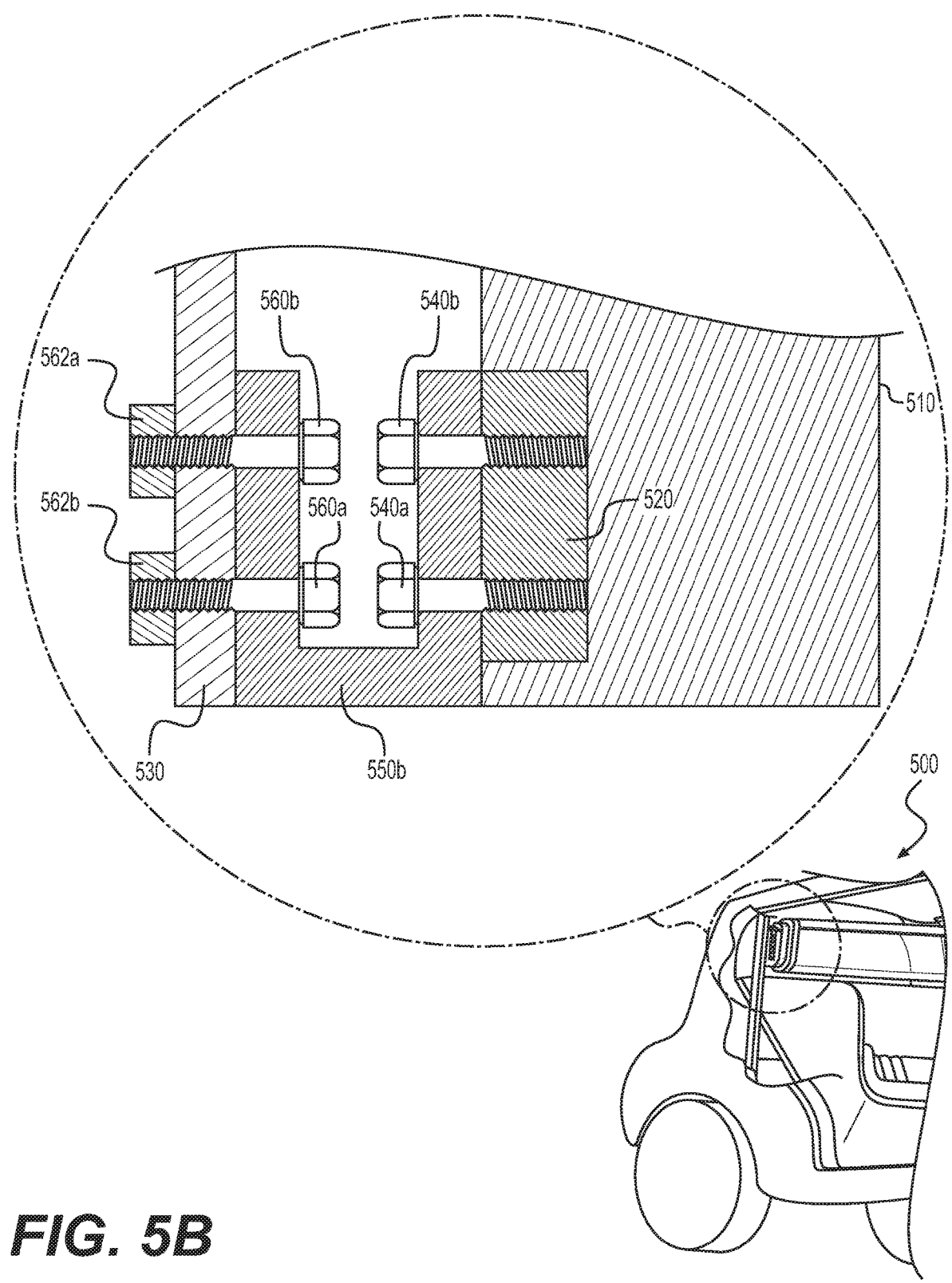
FIG. 5B depicts an example in which a headrest may attach to a vehicle body via a compliant coupling.
Figure 5C:
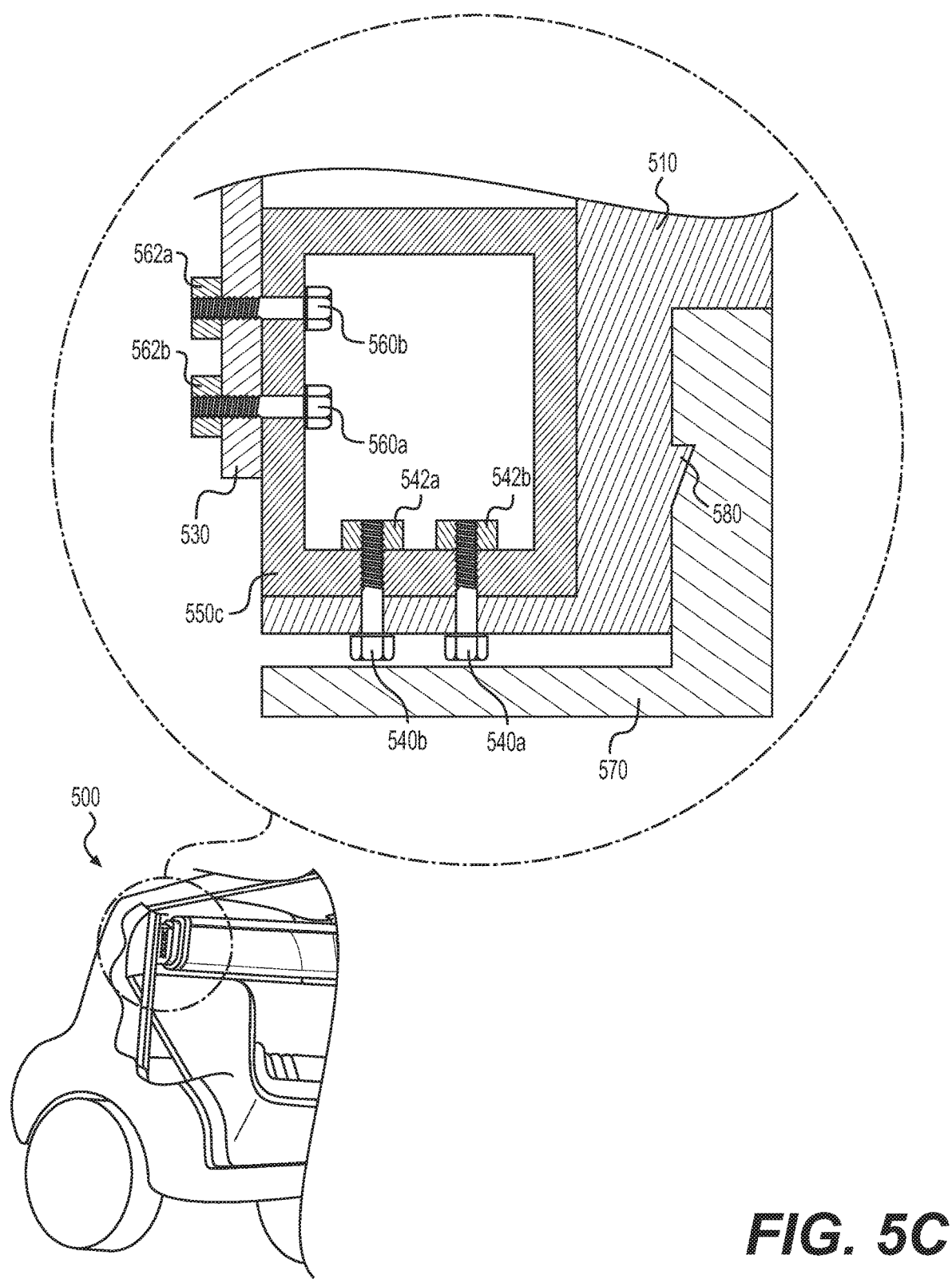
FIG. 5C depicts another example in which a headrest may attach to a vehicle body via a compliant coupling.
Figure 5D:
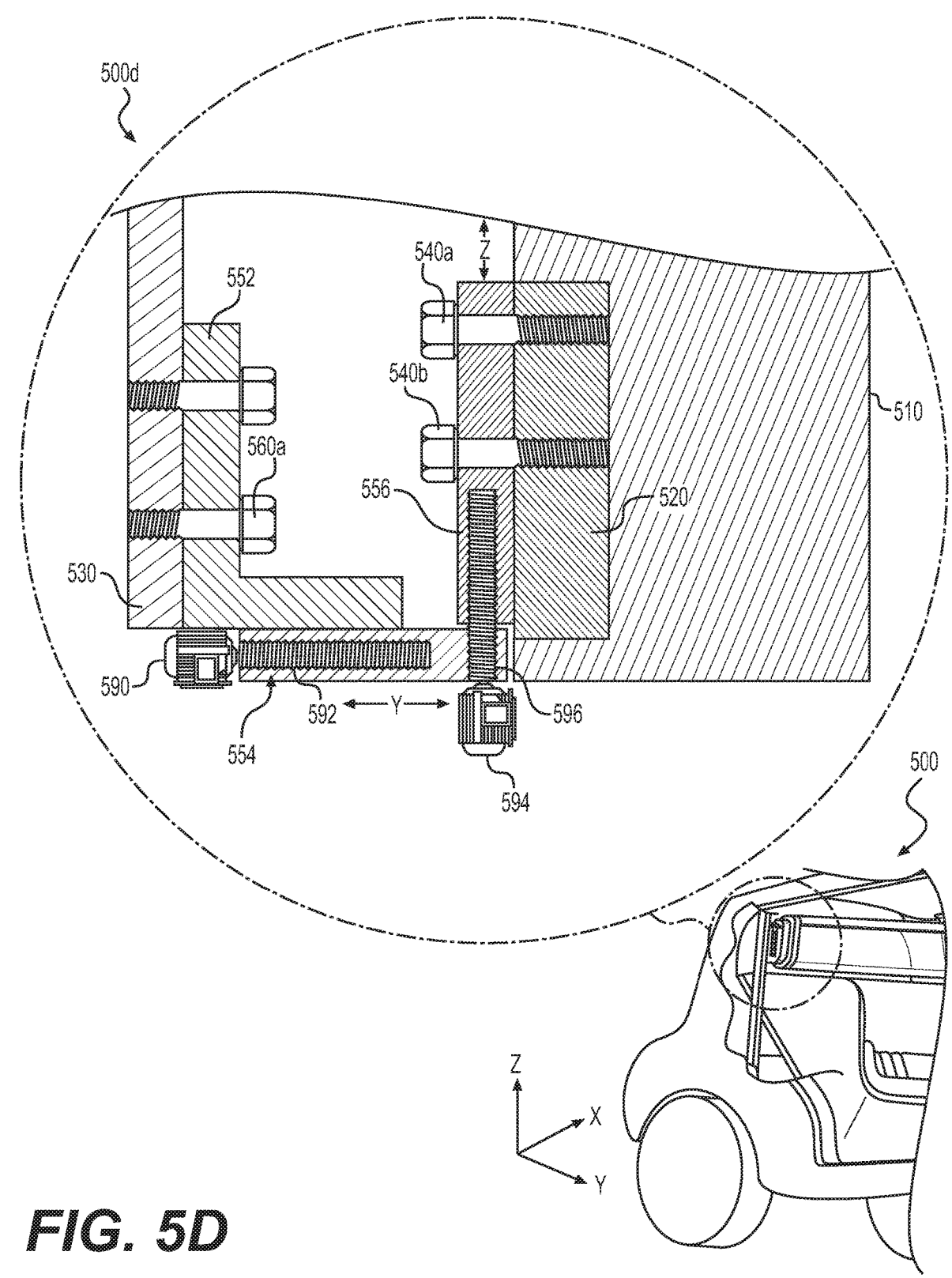
FIG. 5D depicts another example in which a headrest of may attach to a vehicle body via an active coupling.

FIGS. 5B-5D illustrate several examples of couplers that can be used to couple a headrest to a body of a vehicle. In some examples, it may be beneficial to provide a coupling member between the headrest and the vehicle body. For example, it may be advantageous to provide a compliant coupling 550b between the vehicle body 530 and the headrest 510 such that the compliant coupling 550b may absorb some energy from the impact and create a different dynamic and kinematic response than would be expected in examples in which the headrest 510 is directly connected to the vehicle body 530. Such a compliant coupling 550b may be formed integrally with the headrest 510 or the vehicle body 530, or designed in such a way that the headrest 510 may slide over the compliant coupling 550b so as to provide an elegant and conformal packaging, making it appear as if the headrest is directly affixed to the vehicle body. Such a packaging is illustrated in FIG. 5C using similar element numbers as discussed with respect to FIG. 5B. As illustrated in FIG. 5B, a compliant coupling 550b may be affixed on one side to the headrest 510 and to the vehicle body 530 on another side (e.g., an opposite side). As shown in FIG. 5B, the compliant coupling 550b may be affixed to the headrest 510 by a fastening mechanism, such as bolts 540a, 540b which can be received by insert or receptacle 520. In such a configuration, the compliant coupling 550b may then be affixed to the vehicle body 530 by one or more fastening mechanisms, such as bolts 560s, 560b and nuts 562a, 562b, though any other fastening mechanism is contemplated (such as those listed above). Further, though the bolts 540a, 540b, 560a, 560b are shown in FIG. 5B as being substantially parallel, in some examples, the fastening mechanisms may be aligned at any angle relative to each other. For example, in some configurations, it may be advantageous to have the sets of fasteners positioned at right angles, as shown in FIG. 5C. In some examples, the compliant coupling 550b is integrally formed with the headrest 510. In other examples, the compliant coupling 550b may be integrally formed with the vehicle body 530. In still other examples the compliant coupling 550b may be a separate component.

FIG. 5C another example compliant coupling 550c which may be used to couple the headrest 500 to the vehicle body 530 via a fastening mechanism, such as nuts 562a, 562b and bolts 560a, 560b, though any other fastening mechanism is contemplated (such as those described above). As in the example illustrated in FIG. 5B, the compliant coupling 550c may be coupled to the headrest 510 using another fastening mechanism, such as nuts 542a, 542b and bolts 540a, 540b, though any other fastening mechanism is contemplated, such as those described above. Additionally, or in the alternative, the headrest 510 may also have a covering member 570. The covering member 570 may fit over the compliant coupling 550b and/or a portion of the headrest 510 such that the fastening mechanism is hidden from passenger view, giving the impression that the headrest 510 is affixed directly to the vehicle body 530. In some examples, the headrest 510 and the covering member 570 may form one or more complimentary sections 580 such that the covering member 570 and the headrest 510 lock together when the covering member 570 is slid or otherwise placed onto headrest 510. In other examples, other mechanisms are contemplated such that the covering member 570 may be releasably coupled to headrest 510 without additional hardware, such as fasteners. In some examples, the size, shape, and material of the compliant coupling(s) may be chosen to provide a damping effect between the headrest and the vehicle body. In some examples, the compliant coupling may be made of a relatively ductile and/or compliant material that will deform responsive to an impact thereby absorbing or damping some of the impact forces and minimizing the forces transmitted to the passenger. By way of example and not limitation, the compliant couplings may be made of a ductile metal (e.g., aluminum, mild steel, etc.), plastic, rubber, or any other material having a stiffness lower than that of the vehicle body.

FIG. 5D illustrates yet another coupling 500d that can be used to couple the headrest 500 to the vehicle body 530. In this example, the coupling may be coupled to portion of the body of the vehicle behind the passengers' heads (i.e., to a surface of the vehicle body behind the headrest as opposed to on lateral sides of the headrest as FIGS. 5A-5C illustrate). The coupling 500d may be fastened to the vehicle body and/or the headrest by one or more fastening mechanisms, such as bolts 540a, 540b, 560a, and 560b, though any other fastening mechanism is contemplated (such as those described above). In the example of FIG. 5D, the coupling 500d comprises an active coupling that is actuatable to actively move the headrest 510 relative to the vehicle body 530 in response to an impact, user control, or other input. In such examples, the active coupling 500d may be mechanically driven to provide motion and/or damping of the headrest during an impact. In some examples, control of the active coupling 500d may be based at least in part on a size, shape, weight, and/or other characteristics of a passenger using the headrest 510 to further minimize effects imparted to the passenger due to an impact. Such characteristics of the passenger can be determined based on one or more sensors in the vehicle, such as the occupancy sensors 430 or other sensors of the vehicle 500, previously obtained user profile data of the one or more passengers, user input of the passengers, and/or other sources.

As shown in FIG. 5D, the coupling 500d in this example comprises a stationary bracket 552, a first movable bracket 554, and a second movable bracket 556. The first movable bracket 554 may be slidably coupled to the stationary bracket 552 (e.g., by one or more tracks, slides, slots, grooves, rails, etc.) for sliding motion of the first movable bracket 554 in the Y direction (i.e., a longitudinal direction of the vehicle in this example) relative to the stationary bracket 552. A first electric motor 590 may be fixed relative to stationary bracket 552 and may be coupled to a first screw drive 592 with threads that engage complimentary threads on the first movable bracket 554. Activating the first electric motor 590 causes the first screw drive 592 to rotate, thereby driving the first movable bracket 554 and hence the headrest 510 for motion in the Y direction.

The second movable bracket 556 is slidably coupled to the first movable bracket 554 (e.g., by one or more tracks, slides, slots, grooves, rails, etc.) for sliding motion of the second movable bracket 556 in the Z direction (i.e., a height direction of the vehicle in this example) relative to the first movable bracket 554. A second electric motor 594 may be fixed relative to first movable bracket 554 and may be coupled to a second screw drive 596 with threads that engage complimentary threads on the second movable bracket 556. Activating the second electric motor 594 causes the second screw drive 596 to rotate, thereby driving the second movable bracket 556 and hence the headrest 510 for motion in the Z direction. Thus, the active coupling 500d allows for adjustment of the position of the headrest 510 in the Y (front-to-back or longitudinal) and/or Z (up-and-down or height) directions relative to the vehicle body 530. Such adjustment may be performed responsive to user input received via a user interface of the vehicle or received from a mobile device of a passenger. Additionally or alternatively, such adjustment may be performed automatically based on one or more passenger profiles (e.g., upon determining an identity and/or characteristic(s) of a passenger such as by an occupancy sensor such as occupancy sensor 430, a vehicle computing device such as computing device 410 may adjust the position of the headrest 510 based on the characteristic(s) of the passenger and/or a user profile of the passenger). Additionally or alternatively, a vehicle computing device such as computing device 410 may drive the active coupling 500d to adjust the position of the headrest 510 responsive to an impact or predicted impact in order to minimize effects imparted to the passenger due to the impact. While FIG. 5D illustrates an example of an active coupling using electric motors and two axis screw drives, in other examples additional or alternative headrest manipulators may be used such as those described herein.

Figure 6:
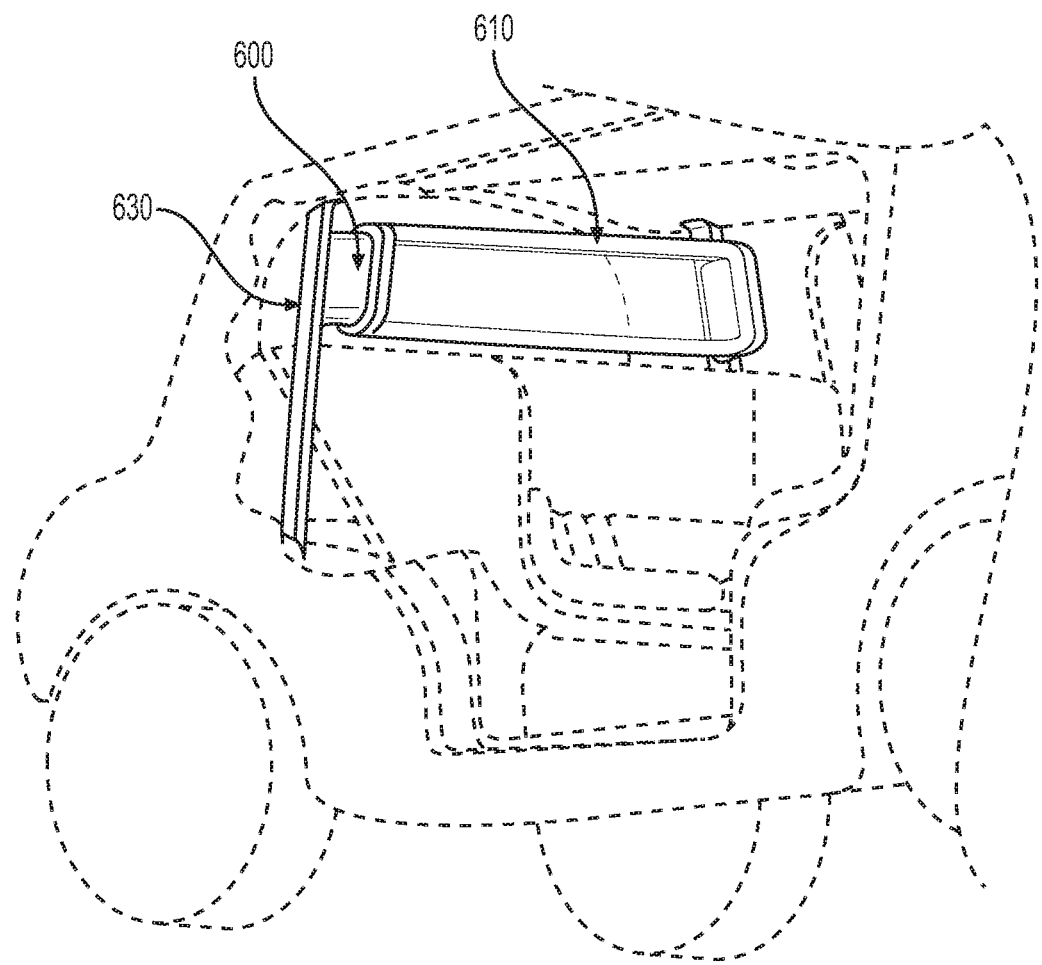
FIG. 6 illustrates another example in which a headrest of may attach to a vehicle body via a coupling.

FIG. 6 is a partial cut-away view of a vehicle showing additional details of example couplings 600 used to mount a headrest 610 to a vehicle body 630. As shown in this example, the headrest 610 is coupled to the vehicle body 630 by a pair of couplings 600, one coupling 600 disposed at each lateral end of the headrest 610. Each coupling 600 comprises an elongated solid or tubular member that extends between the headrest 610 and a structural pillar or column of the vehicle body 630. Each of the couplings 600 has a flowing, continuous geometry that gradually transitions from a first end of each coupling 600 sized and shaped to match a contour of a corresponding lateral side of the headrest body 610 to a second end sized and shaped to match a contour of the portion of the vehicle body 630 to which it attaches. In other examples, the couplings 600 may correspond to one of the other couplings described with reference to FIGS. 5A-5D, or any other coupling usable to connect a headrest to a vehicle body.

Example Individual Headrest

Figure 7A:
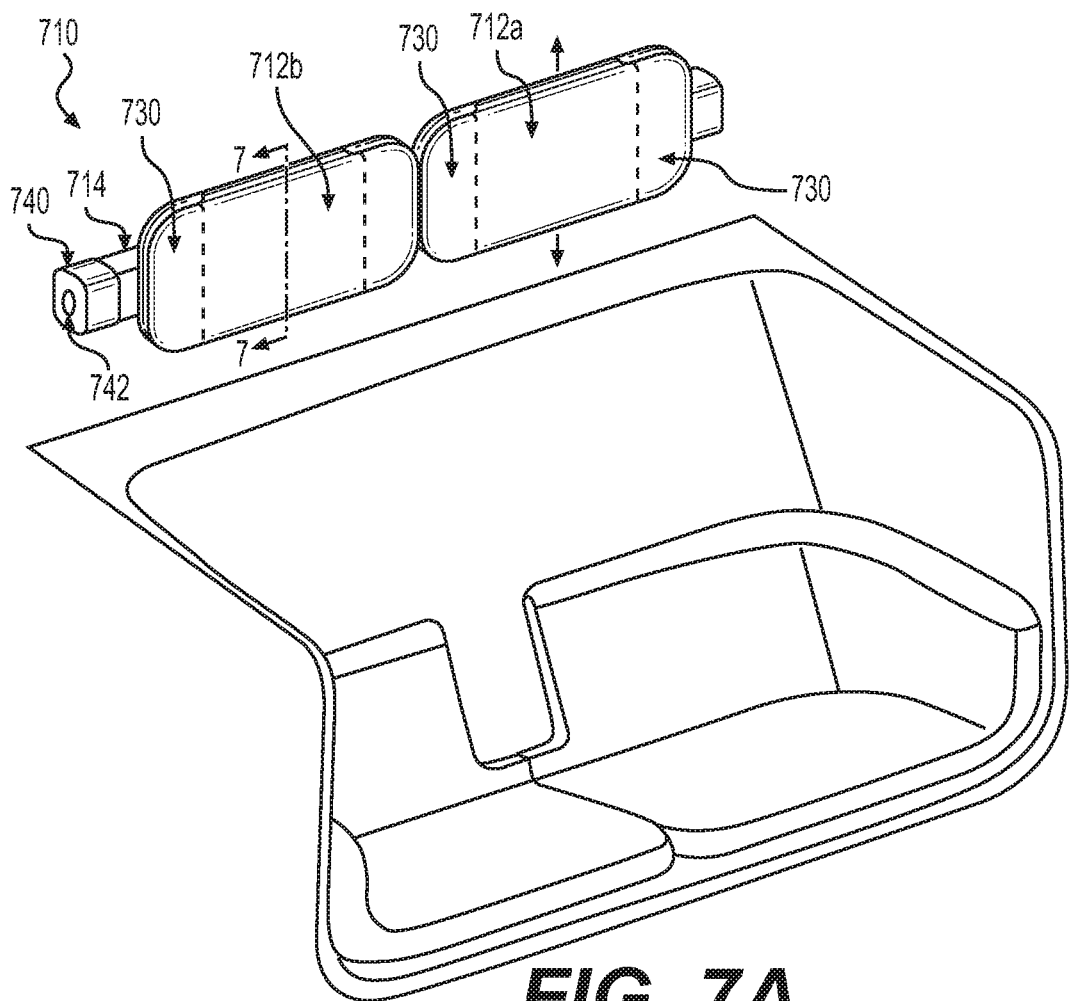
FIG. 7A illustrates a perspective view of another example headrest assembly with passenger flaps relative to a seating area.

FIG. 7A illustrates another example passenger headrest system 700 including a headrest assembly 710 mountable to a vehicle body (not shown in this figure) at one or more mounting areas 740. Such mounting areas 740 may comprise one or more receptacles 742 for receiving fastening mechanism(s). The headrest assembly 710 in this example comprises multiple individual headrest portions 712*a* and 712*b* coupled to an elongated frame 714. Each headrest portion 712*a*, 712*b* may be individually movable vertically (as shown by the arrows above and below headrest portion 712*a* in FIG. 7A) relative to the frame 714. Movement of the headrest portions 712*a*, 712*b* may be performed manually by the user physically moving the headrest, based on user input via a user interface of the vehicle or a mobile device of a passenger, or automatically based on one or more sensors (e.g., occupancy sensors 430) and/or user profile data (e.g., preset headrest position data) stored (e.g., stored at and/or accessible by computing device 410).

The elongated frame 714 may comprise one or more solid rods or hollow tubes. The cross-sectional shape, materials, and thickness of such rods or tubes may be determined to have strength and/or rigidity sufficient to provide passenger support for impacts at various speeds. By way of example and not limitation, the rods or tubes may comprise metal, plastic, composite material (e.g., carbon fiber, fiberglass, etc.), or rigid or semi-rigid foam.

Each of the headrest portions 712*a*, 712*b* may have one or more flaps 730 (two flaps are shown on each headrest portion in this example) at lateral edges of the respective headrest portion. The flaps 730 may be pivotable about a pivot line (the dashed vertical lines on each headrest portion) that extends vertically the height of the headrest portion 712*a*, 712*b* (similar to the pivot line 132 shown in FIGS. 1A and 1B). The flaps 730 may be used by one or more passengers to provide comfort and/or privacy. The flaps 730 in this example are shown in a stowed position flat against the frame 714, but are pivotable to any of the forward, deployed, natural, intermedia, or other positions and using any of the pivoting and actuation techniques and structured described with respect to the other examples described herein.

Figure 7B:
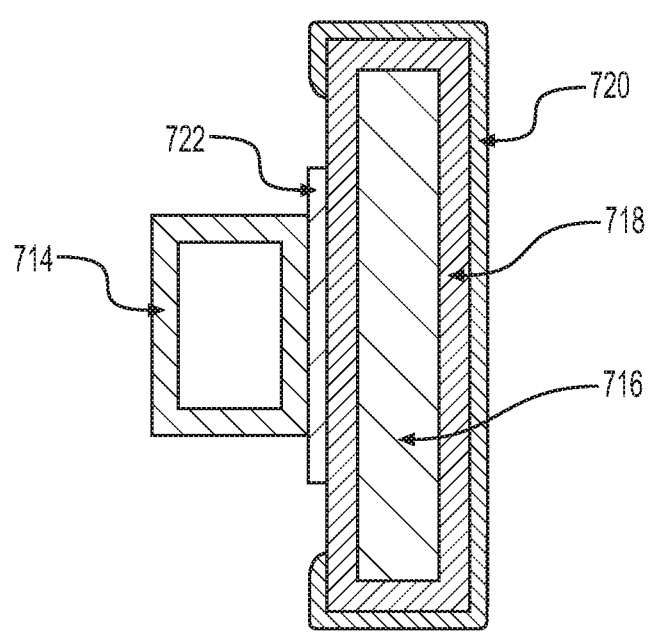
FIG. 7B illustrates a cross-section of the headrest assembly of FIG. 7A.

FIG. 7B is a cross sectional view of the example headrest portion 712*b* taken along line 7-7 in FIG. 7A. In this example, each headrest portion 712*a*, 712*b* includes a core 716, an intermediate layer 718, and an outer sheet or membrane 720. The core 716 may be solid or hollow and may comprise a rigid, semi-rigid, or resilient material. The intermediate layer 718 at least partially surrounds or covers the core 716, and comprises a resilient material. The outer sheet or membrane 720 is a flexible sheet of material that wraps around and at least partially covers the intermediate layer 718. By way of example and not limitation, the core 716 may comprise metal, plastic, wood, composite material, a rigid or semi-rigid foam, the intermediate layer 718 may comprise a flexible material such as foam, rubber, silicone, batting, and the outer sheet or membrane comprises a flexible sheet of material such as mesh, fabric, leather, plastic, or the like. In some examples, the intermediate layer 718 may be softer and more resilient than the core 716 and/or the core 716 may be more rigid than the intermediate layer 718. In some examples, each headrest may have a rigid frame like that of FIGS. 1A-1I and may have a cross section similar to that of FIG. 2 in which a sheet or membrane is stretched across the frame. As mentioned with reference to FIG. 7A, the headrest portions 712*a*, 712*b* may be movable vertically relative to the frame 714. This vertical movement may be accomplished by one or more slide mechanisms 722 (e.g., one or more tracks, slides, slots, grooves, rails, etc.) disposed between the frame 714 and the core 716 of the headrest portions 712*a*, 712*b*.

Exemplary Computerized System

Figure 8:
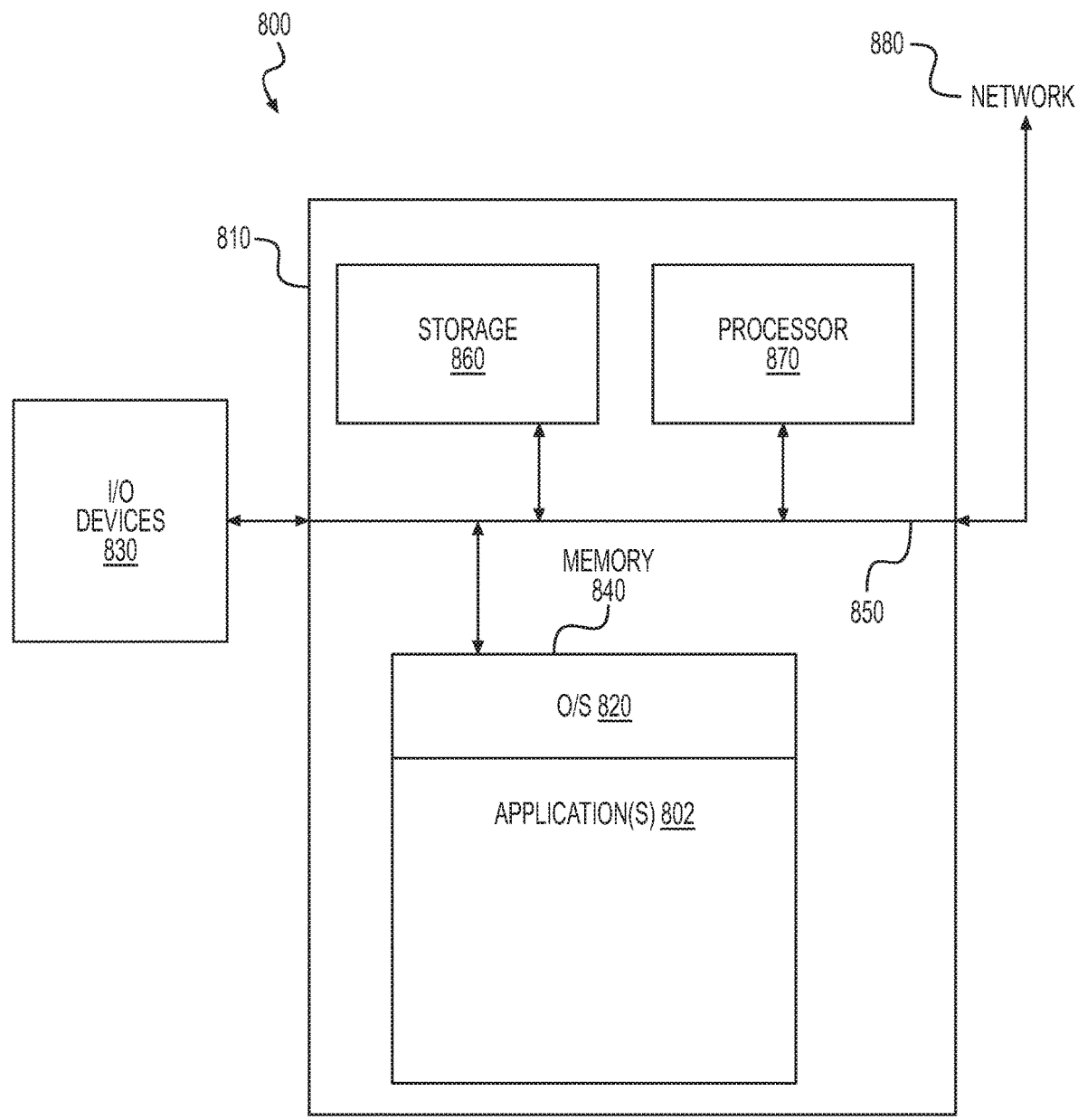
FIG. 8 depicts an example block diagram for a computer system implementing the techniques described herein.

Turning briefly to FIG. 8, a computerized system 800 is depicted as an example computerized system on which the disclosures may be implemented in whole or in part. The computerized system 800 depicts a computer system 810 that comprises a storage 860, one or more processor(s) 870, a memory 840, and an operating system 820. The storage 860, the processor(s) 870, the memory 840, and the operating system 820 may be communicatively coupled over a communication infrastructure 850. Optionally, the computer system 810 may interact with a user, or environment, via input/output (I/O) device(s) 830, as well as one or more other computing devices over a network 880, via the communication infrastructure 850. The operating system 820 may interact with other components to control one or more applications 802.

The systems and methods described herein can be implemented in software or hardware or any combination thereof. The systems and methods described herein can be implemented using one or more computing devices which may or may not be physically or logically separate from each other. The methods may be performed by components arranged as either on-premises hardware, on-premises virtual systems, or hosted-private instances. Additionally, various aspects of the methods described herein may be combined or merged into other functions.

An exemplary computerized system for implementing the systems and methods described herein is illustrated in FIG. 8. A processor or computer system can be configured to particularly perform some or all of the methods described herein. In some embodiments, the methods can be partially or fully automated by one or more computers or processors. The systems and methods described herein may be implemented using a combination of any of hardware, firmware and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™. However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc. can be stored in tables in the RDBMS. The tables can have predefined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus, local interconnect network (LIN), or other interfaces.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. An example system comprises one or more processors; and one or more computer readable storage media communicatively coupled to the one or more processors and storing instructions that are executable by the one or more processors to: determine a passenger state of a seat in an autonomous vehicle; determine a flap state of a headrest in the autonomous vehicle; and engage a flap in the headrest based, at least in part, on one or more of the passenger state and the flap state.

B. The system according to example A, further comprising at least one of a pressure sensor or image sensor, wherein the passenger state is determined based at least in part on input from the at least one of the pressure sensor or image sensor.

C. The system according to one of example A or B, further comprising at least one of a proximity sensor, line of sight sensor, electromagnetic sensor, pressure sensor, encoder, or range sensor, wherein the flap state is determined based at least in part on input from the at least one of the proximity sensor, line of sight sensor, electrical connection sensor, pressure sensor, encoder, or range sensor.

D. The system according any of examples A-C, wherein when executed the instructions to determine the passenger state determine whether the seat is occupied or unoccupied by a passenger.

E. The system according any of examples A-D, wherein the headrest wraps around portions of at least three sides of an interior of a seating area of the autonomous vehicle.

F. The system according any of examples A-E, wherein the flap state is determined to be one of a forward state, back state, or natural state.

G. The system according any of examples A-F, further comprising an actuator to move the flap, wherein, when executed, the instructions to engage the flap in the headrest cause the actuator to move the flap in the headrest from the determined flap state to another flap state different than the determined flap state.

H. The system according any of examples A-G, wherein the headrest is coupled to a vehicle body of the autonomous vehicle.

I. An example vehicle comprises: a seat disposed in a passenger compartment of the autonomous vehicle; a headrest disposed in the seating compartment above the seat, the headrest comprising: at least one flap; and at least one actuator to move the at least one flap of the headrest; one or more processors; and memory communicatively coupled to the one or more processors, the memory storing computer-executable instructions that, when executed by the one or more processors cause the vehicle to perform operations comprising: receiving a signal indicating a change in position of the at least one flap; and instructing the at least one actuator to move the at least one flap based at least in part on the signal.

J. The vehicle according to example I, further comprising: one or more sensors communicatively coupled to the one or more processors, wherein the operations further comprise: receiving, via the one or more sensors, occupancy data indicating presence or absence of a passenger occupying the seat; and receiving, via the one or more sensors, flap data indicating a flap state of the at least one flap, wherein the signal indicating the change in position of the at least one flap is based at least in part on the occupancy data and the flap data.

K. The vehicle according one of examples I or J, wherein the operations further comprise: determining that the seat is unoccupied; and instructing, based at least in part on determining that the seat is unoccupied, the at least one actuator to move the at least one flap to a normative state.

L. The vehicle according any of examples I-K, wherein the normative state is one of a forward state, a back state, or a natural state.

M. The vehicle according any of examples I-L, wherein the headrest is independent of the seat and is coupled to a vehicle body of the autonomous vehicle.

N. The vehicle according any of examples I-M, further comprising a compliant coupling interposed between the vehicle body and the headrest, wherein the headrest is coupled to the vehicle body via the compliant coupling.

O. The vehicle according any of examples I-N, wherein the headrest wraps at least partially around at least three sides of an interior of a seating area of the autonomous vehicle.

P. The vehicle according any of examples I-O, wherein the headrest further comprises: one or more rods or tubes forming a frame of the headrest; a resilient material covering at least a portion the one or more rods or tubes; and a flexible sheet material stretched over the frame of the headrest.

Q. One or more example computer-readable media storing instructions that, when executed by one or more processors, configure the one or more processors to perform operations comprises: receiving a signal from an occupancy sensor of a vehicle; determining, via the occupancy sensor, a presence of a passenger occupying a seat corresponding to a headrest of the vehicle; and activating a headrest manipulator to change a position of at least a portion of the headrest based at least in part on the determining the presence of the passenger.

R. The one or more computer-readable according to example Q, the operations further comprising determining a current state of the headrest, wherein the activating the headrest manipulator is further based at least in part on the current state of the headrest.

S. The one or more computer-readable according to one of example Q or R, the operations further comprising receiving a manual input from the passenger to adjust a position of at least the portion of the headrest.

T. The one or more computer-readable according any of examples Q-S, the operations further comprising: determining absence of the passenger from the seat corresponding to the headrest; and causing the headrest manipulator to return at least the portion of the headrest to a normative state responsive to determining the absence of the passenger from the seat corresponding to the headrest.

What is claimed is:

1. A system comprising:
   one or more processors;
   a headrest;
   a flap pivotably coupled to the headrest;
   an actuator to move the flap; and
   one or more computer readable storage media communicatively coupled to the one or more processors and storing instructions that are executable by the one or more processors to:
      determine a passenger state of a seat in an autonomous vehicle;
      determine a first flap state of the flap relative to the headrest in the autonomous vehicle; and
      cause the actuator to engage the flap based, at least in part, on one or more of the passenger state and the first flap state, to move the flap relative to the headrest from the first flap state to a second flap state different than the first flap state,
      wherein the flap is pivotable along a pivot line that extends vertically a height of the headrest.

2. The system according to claim 1, further comprising at least one of a pressure sensor or image sensor, wherein the passenger state is determined based at least in part on input from the at least one of the pressure sensor or image sensor.

3. The system according to claim 1, further comprising at least one of a proximity sensor, line of sight sensor, electromagnetic sensor, pressure sensor, encoder, or range sensor, wherein the first flap state is determined based at least in part on input from the at least one of the proximity sensor, line of sight sensor, electrical connection sensor, pressure sensor, encoder, or range sensor.

4. The system according to claim 1, wherein when executed the instructions to determine the passenger state determine whether the seat is occupied or unoccupied by a passenger.

5. The system according to claim 1, wherein the headrest wraps around portions of at least three sides of an interior of a seating area of the autonomous vehicle.

6. The system according to claim 1, wherein the first flap state is determined to be one of a forward state, back state, or natural state, and the second flap state is another of the forward state, back state, or natural state.

7. The system according to claim 1, wherein the headrest is coupled to a vehicle body of the autonomous vehicle.

8. A vehicle comprising:
   a seat disposed in a passenger compartment of the vehicle;
   a headrest disposed in the seating compartment above the seat, the headrest comprising
      an actuator;
   one or more processors;
   a flap pivotably coupled to the headrest; and
   memory communicatively coupled to the one or more processors, the memory storing computer-executable instructions that, when executed by the one or more processors cause the vehicle to perform operations comprising:
      receiving a signal indicating a change in position of the one flap; and
      instructing the actuator to move the flap relative to the headrest from a first flap state to a second flap state different than the first flap state based at least in part on the signal,
      wherein the flap is pivotable along a pivot line that extends vertically a height of the headrest.

9. The vehicle of claim 8, further comprising:
   one or more sensors communicatively coupled to the one or more processors,
   wherein the operations further comprise:
      receiving, via the one or more sensors, occupancy data indicating presence or absence of a passenger occupying the seat; and
      receiving, via the one or more sensors, flap data indicating a flap state of the flap,
      wherein the signal indicating the change in position of the flap is based at least in part on the occupancy data and the flap data.

10. The vehicle according to claim 9, wherein the operations further comprise:
    determining that the seat is unoccupied; and
    instructing, based at least in part on determining that the seat is unoccupied, the actuator to move the flap to a normative state.

11. The vehicle according to claim 10, wherein the normative state is one of a forward state, a back state, or a natural state.

12. The vehicle according to claim 8, wherein the headrest is independent of the seat and is coupled to a vehicle body of the vehicle.

13. The vehicle according to claim 12, further comprising a compliant coupling interposed between the vehicle body and the headrest, wherein the headrest is coupled to the vehicle body via the compliant coupling.

14. The vehicle according to claim 8, wherein the headrest wraps at least partially around at least three sides of an interior of a seating area of the vehicle.

15. The vehicle according to claim 8, wherein the headrest further comprises:
- one or more rods or tubes forming a frame of the headrest;
- a resilient material covering at least a portion the one or more rods or tubes; and
- a flexible sheet material stretched over the frame of the headrest.

16. One or more non-transitory computer-readable media storing instructions that, when executed by one or more processors, configure the one or more processors to perform operations comprising:
- receiving a signal from an occupancy sensor of a vehicle;
- determining, via the occupancy sensor, a presence of a passenger occupying a seat corresponding to a headrest of the vehicle; and
- activating a headrest manipulator to change a position of a flap pivotably coupled to the headrest from a first flap state to a second flap state different than the first flap state based at least in part on the determining the presence of the passenger,
- wherein the flap is pivotable along a pivot line that extends vertically a height of the headrest.

17. The one or more non-transitory computer-readable media according to claim 16, the operations further comprising determining the first state of the headrest, wherein the activating the headrest manipulator is further based at least in part on the first state of the headrest.

18. The one or more non-transitory computer-readable media according to claim 16, the operations further comprising receiving a manual input from the passenger to adjust a position of the flap of the headrest.

19. The one or more non-transitory computer-readable media according to claim 16, the operations further comprising:
- determining absence of the passenger from the seat corresponding to the headrest; and
- causing the headrest manipulator to return the flap to a normative state responsive to determining the absence of the passenger from the seat corresponding to the headrest.

* * * * *